(12) United States Patent
Maggiore

(10) Patent No.: US 12,288,396 B2
(45) Date of Patent: Apr. 29, 2025

(54) METHOD FOR AUGMENTING A DIGITAL PROCEDURE FOR PRODUCTION OF PHARMACOLOGICAL MATERIALS WITH AUTOMATIC VERIFICATION

(71) Applicant: Apprentice FS, Inc., Jersey City, NJ (US)

(72) Inventor: Frank Maggiore, Jersey City, NJ (US)

(73) Assignee: Apprentice FS, Inc., Jersey City, NJ (US)

( * ) Notice: Subject to any disclaimer, the term of this patent is extended or adjusted under 35 U.S.C. 154(b) by 345 days.

(21) Appl. No.: 18/084,335

(22) Filed: Dec. 19, 2022

(65) Prior Publication Data

US 2023/0196774 A1  Jun. 22, 2023

Related U.S. Application Data

(60) Provisional application No. 63/292,184, filed on Dec. 21, 2021, provisional application No. 63/292,193, filed on Dec. 21, 2021.

(51) Int. Cl.
| | |
|---|---|
| G06V 20/40 | (2022.01) |
| G06T 7/73 | (2017.01) |
| G06V 10/25 | (2022.01) |
| G06V 30/224 | (2022.01) |

(52) U.S. Cl.
CPC ............. *G06V 20/46* (2022.01); *G06T 7/73* (2017.01); *G06V 10/25* (2022.01); *G06V 30/2247* (2022.01); *G06V 2201/07* (2022.01)

(58) Field of Classification Search
CPC .... G06V 10/25; G06V 20/46; G06V 30/2247; G06T 7/73
See application file for complete search history.

(56) References Cited

U.S. PATENT DOCUMENTS

2022/0004754 A1* 1/2022 Huang .................... G06N 3/08

* cited by examiner

*Primary Examiner* — Sam Bhattacharya
(74) *Attorney, Agent, or Firm* — Run8 Patent Group, LLC; Peter Miller; Alexander Rodriguez

(57) ABSTRACT

One variation of a method for augmenting a digital procedure for production of pharmacological materials with automatic verification of objects includes: initializing a digital procedure containing a sequence of instructional blocks; and populating a instructional block with a instruction in a set of formats and a set of target objects. The method further includes, in response to an operator initiating an instance of the instructional block: accessing video feeds of the operator performing the instructional block; identifying a target object in a target frame from the video feeds; extracting visual features from the target frame; calculating an identification score for the target object based on the visual features; in response to the identification score falling below a confidence threshold, applying a fiducial to the target object; and linking the target object to the fiducial in the instructional block.

20 Claims, 9 Drawing Sheets

METHOD FOR AUGMENTING A DIGITAL PROCEDURE FOR PRODUCTION OF PHARMACOLOGICAL MATERIALS WITH AUTOMATIC VERIFICATION

CROSS-REFERENCE TO RELATED APPLICATIONS

This Application claims the benefit of U.S. Provisional Application Nos. 63/292,184, filed on 21 Dec. 2021, and 63/292,193, filed on 21 Dec. 2021, each of which is hereby incorporated in its entirety by this reference.

This Application is related to U.S. Non-Provisional application Ser. No. 17/719,120, filed on 12 Apr. 2022, which is hereby incorporated in its entirety by this reference.

TECHNICAL FIELD

This invention relates generally to the field of manufacturing and more specifically to a new and useful method for augmenting a digital procedure for production of pharmacological materials with automatic verification in the field of manufacturing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
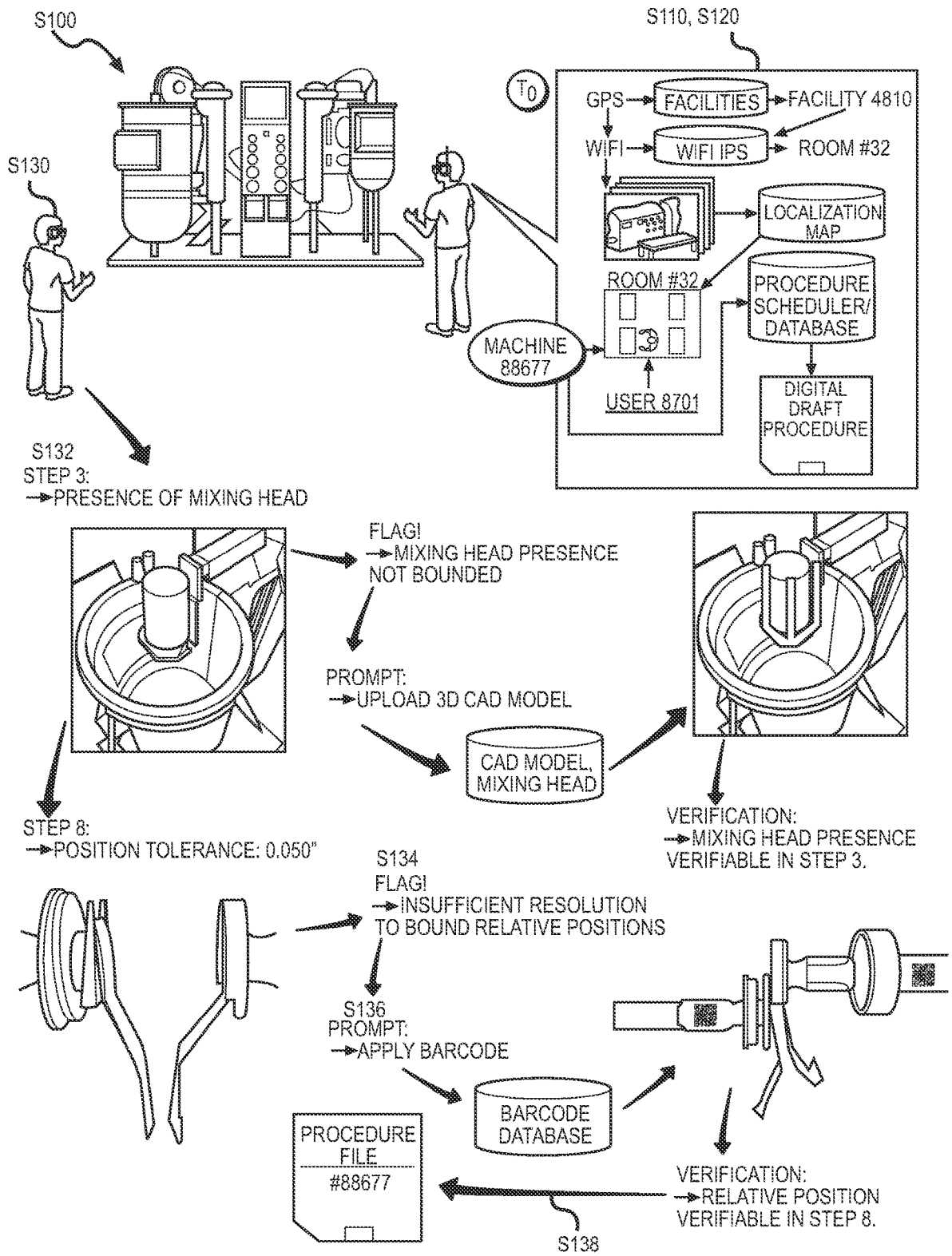
FIG. 1 is a flowchart representation of a method.
Figure 2:
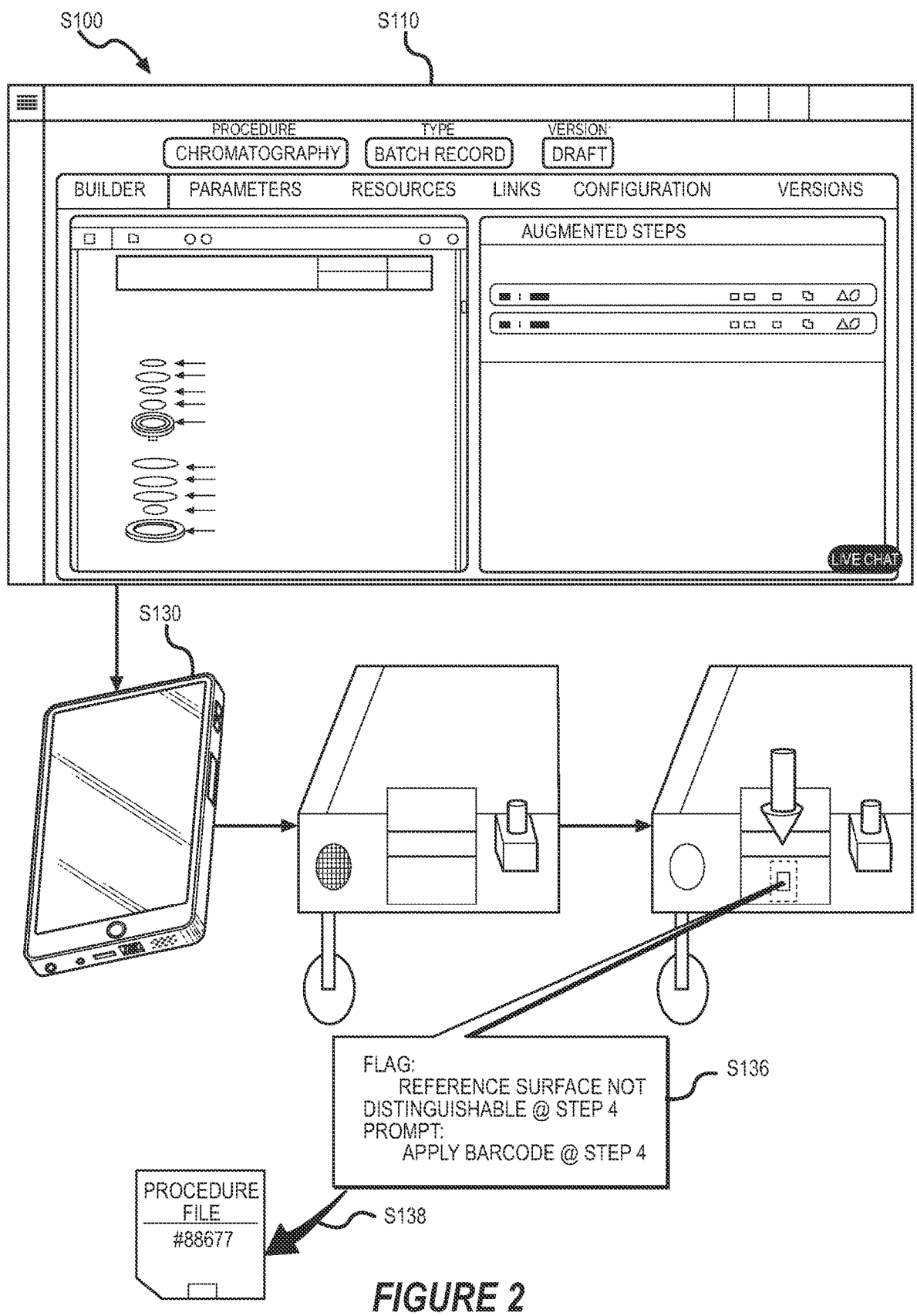
FIG. 2 is a flowchart representation of one variation of the method.
Figure 3:
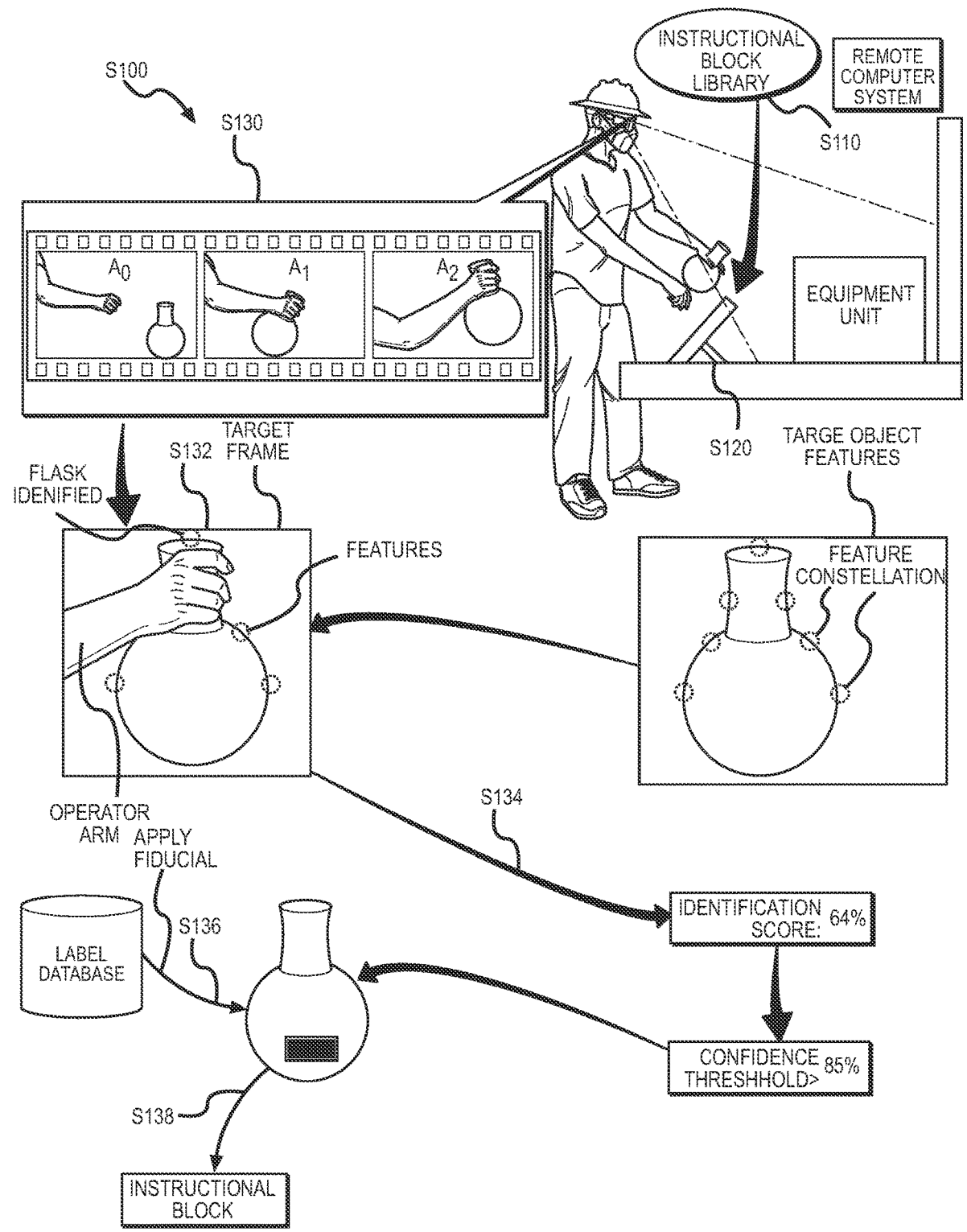
FIG. 3 is a flowchart representation of one variation of the method.
Figure 4:
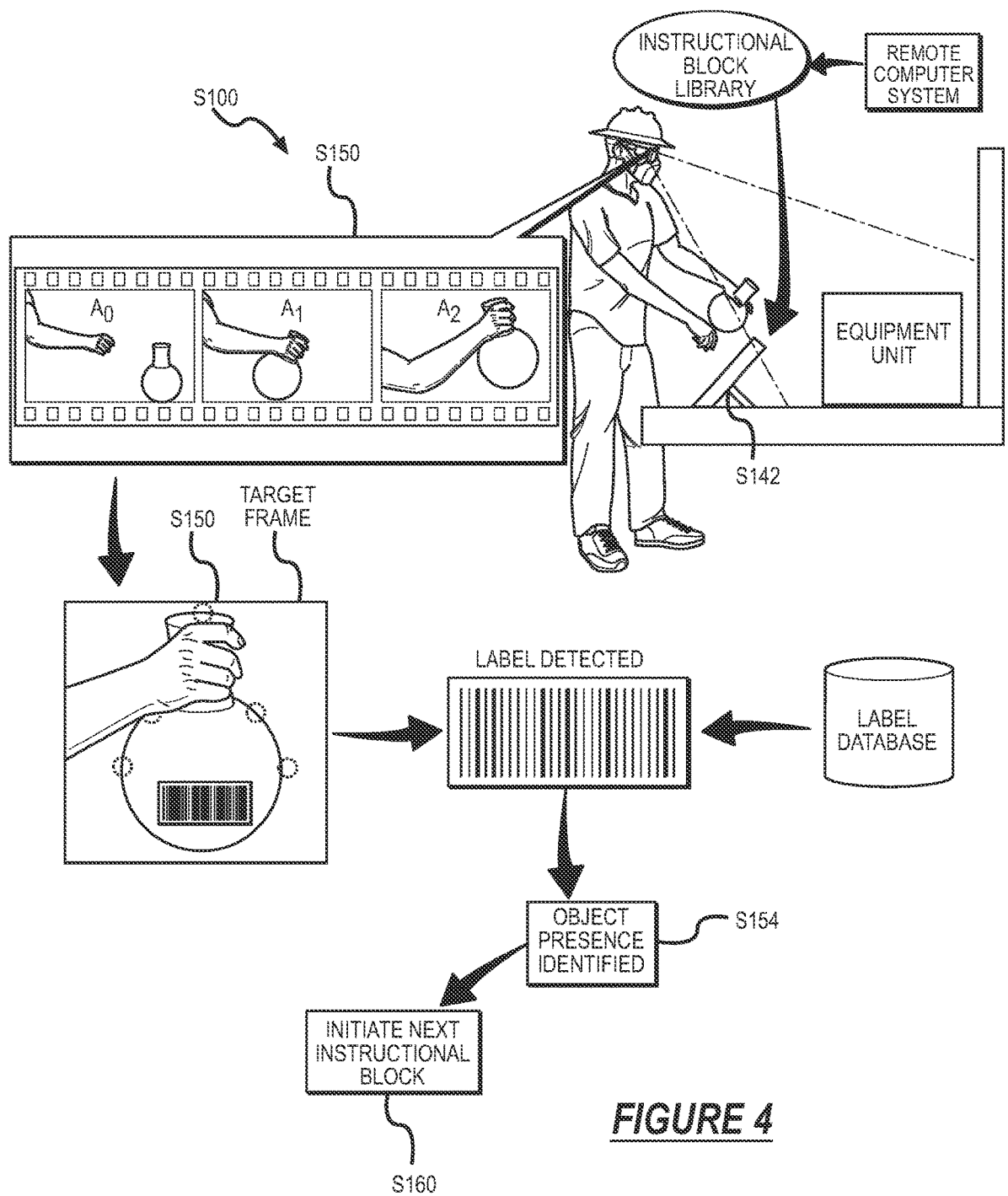
FIG. 4 is a flowchart representation of one variation of the method.
Figure 5:
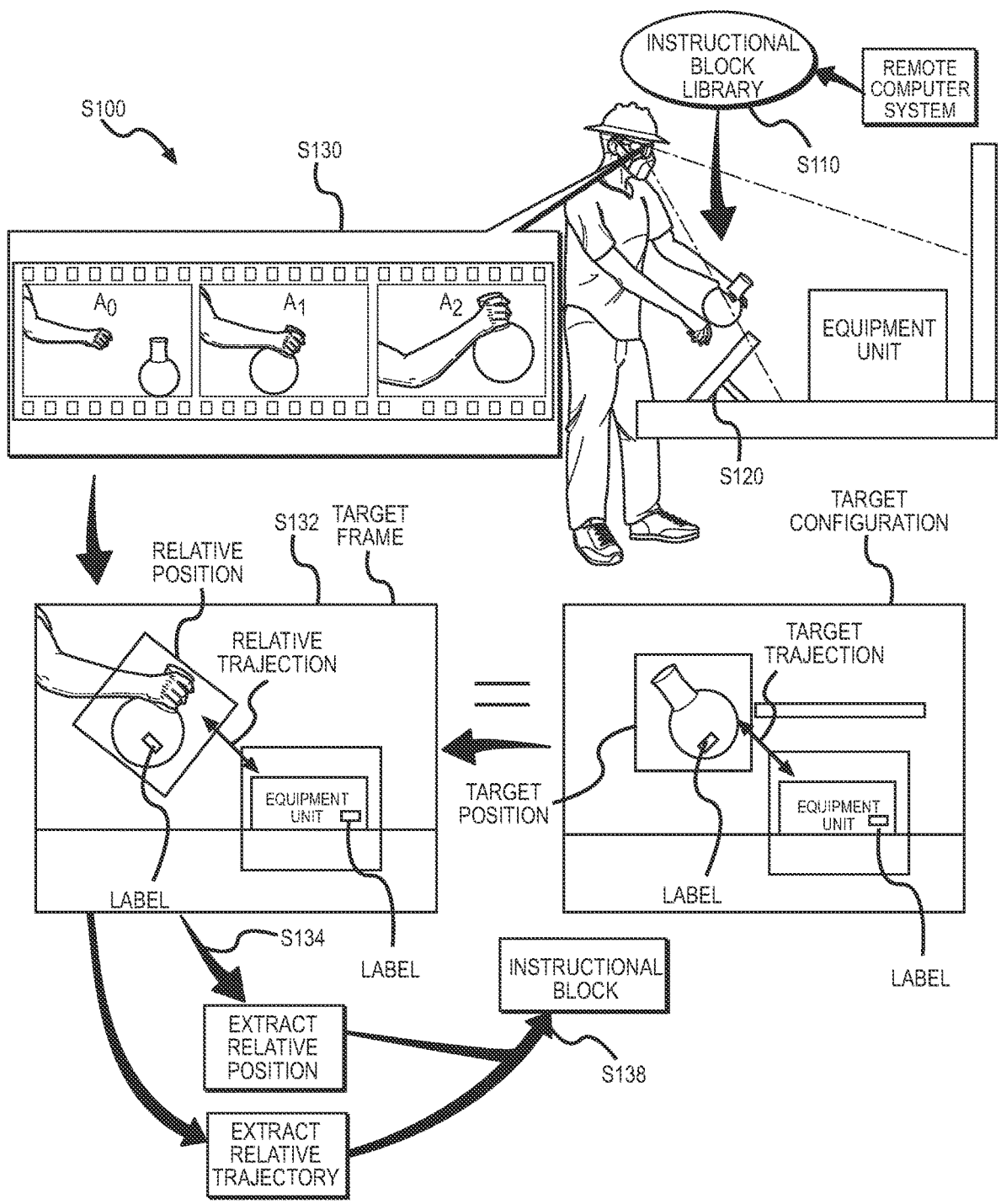
FIG. 5 is a flowchart representation of one variation of the method.
Figure 6:
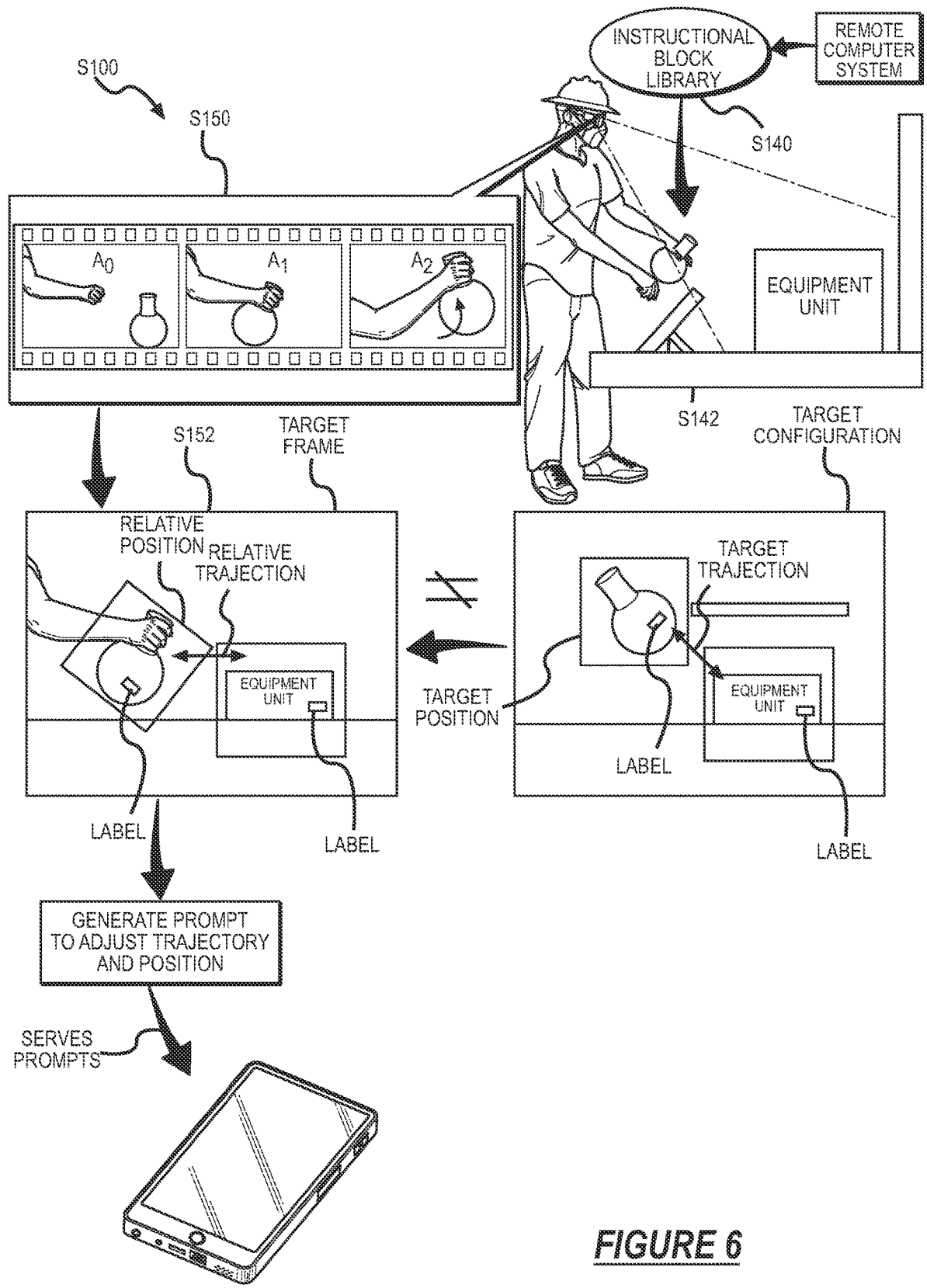
FIG. 6 is a flowchart representation of one variation of the method.
Figure 7:
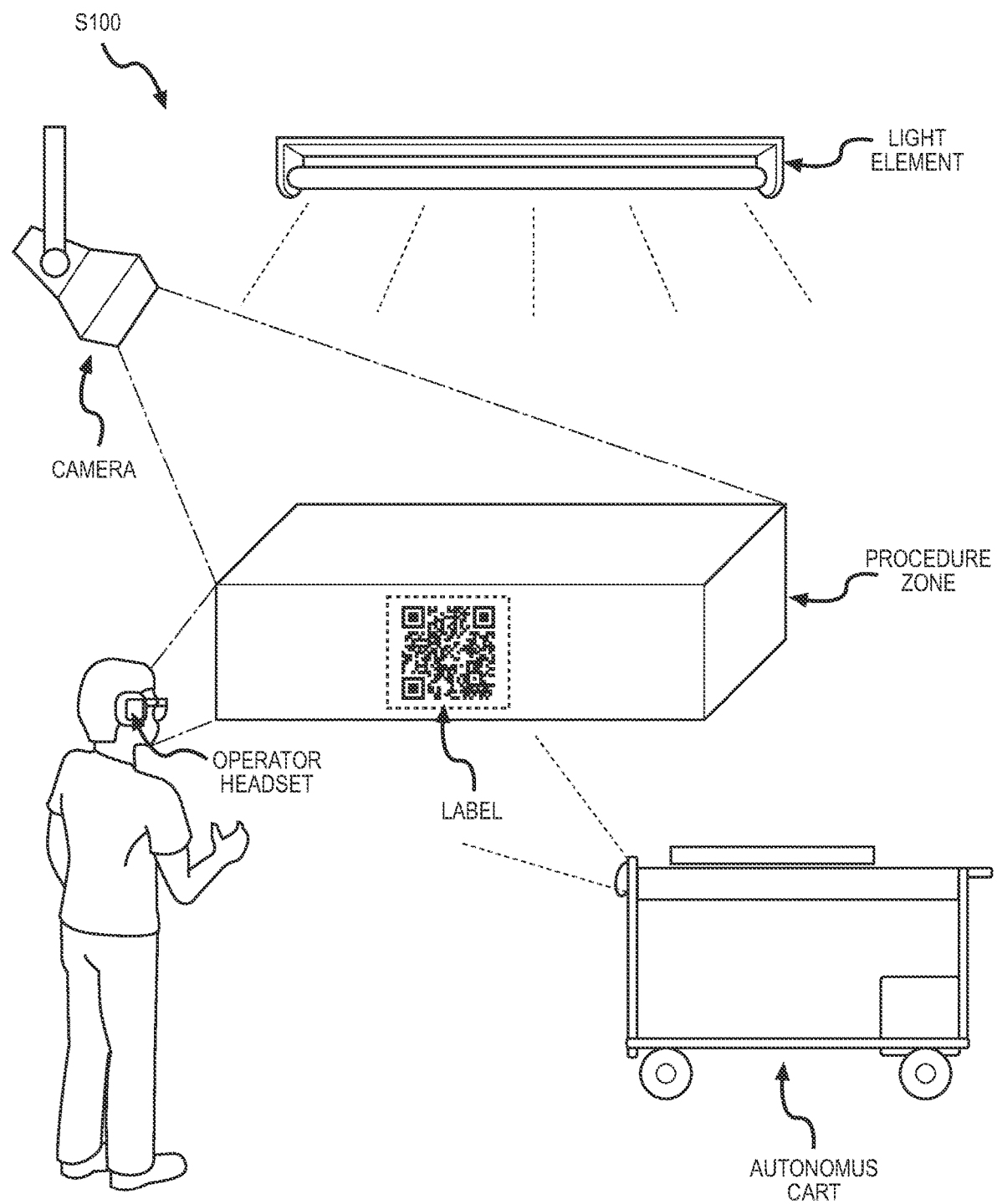
FIG. 7 is a schematic representation of one variation of the method.
Figure 8:
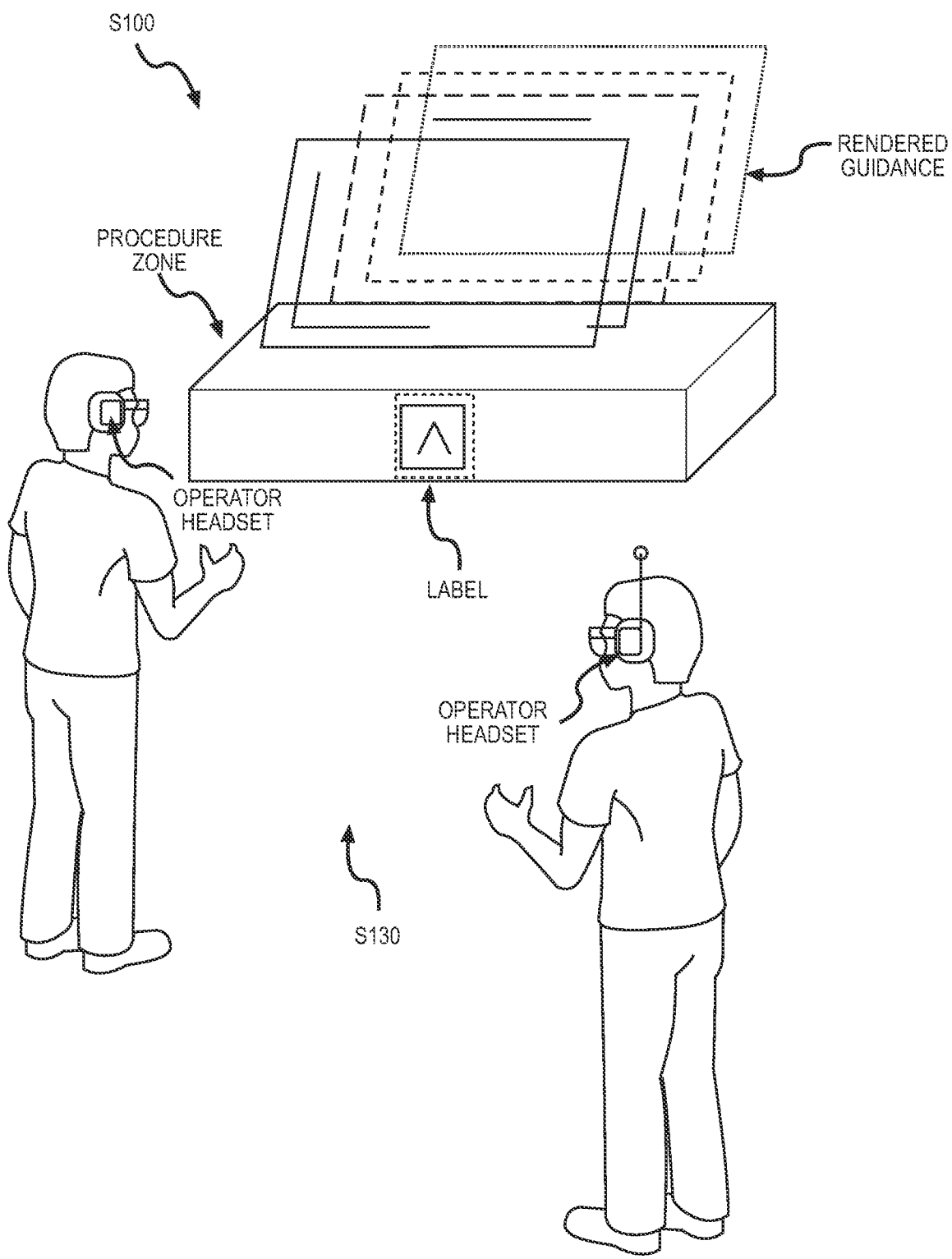
FIG. 8 is a schematic representation of one variation of the method.
Figure 9:
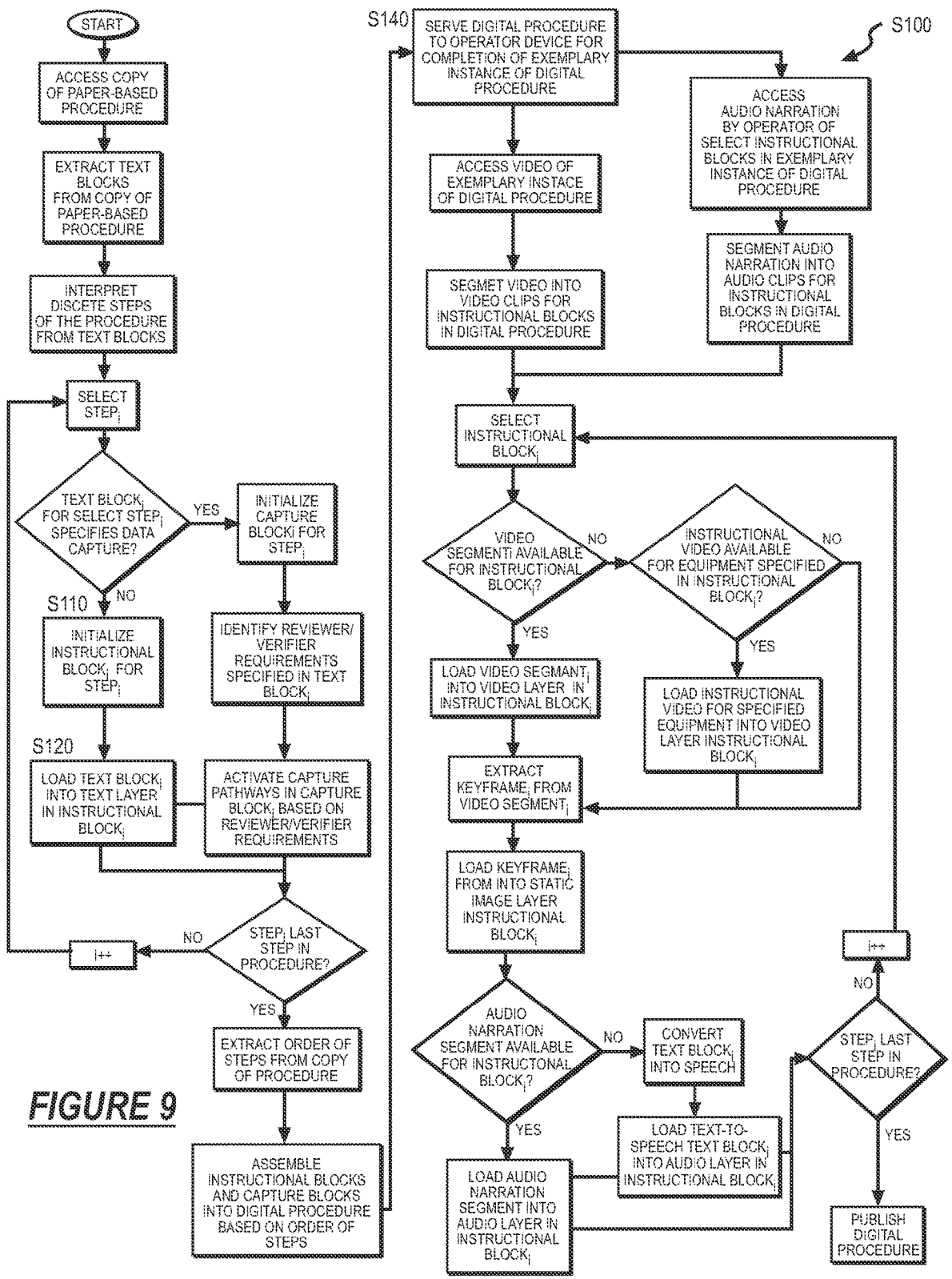
FIG. 9 is a flowchart representation of one variation of the method.

As shown in FIGS. 1 and 2, a method S100 for augmenting a digital procedure for production of pharmacological materials with automatic verification includes, during a setup period: initializing a first digital procedure corresponding to a first procedure zone within a facility and containing a sequence of instructional blocks in Block Silo; and populating a first instructional block, in the sequence of instructional blocks, with a first instruction in a first set of formats and a first set of target objects associated with performance of the first instruction in Block S120.

Additionally, the method S100 includes, in response to a first operator initiating a first instance of the first instructional block, in the sequence of instructional blocks, at the first procedure zone: accessing a first set of video feeds of a first operator performing the first instruction of the first instructional block in Block S130; and identifying a first target object, from the first set of target objects in the first instructional block, in a target frame from the first set of video feeds in Block S132.

Furthermore, the method S100 includes: extracting a first set of visual features from the target frame in the first set of video feeds depicting the first target object; and calculating an identification score for the first target object depicted in the first set of video feeds based on the first set of visual features in Block S134;

The method S100 also includes: in response to the first identification score falling below a target confidence threshold, applying a first fiducial to the first target object in Block S136; and linking the first target object to the first fiducial in the first instructional block in Block S138.

One variation of the method S100 further includes: at a second operator device associated with a second operator, accessing the first digital procedure in Block S140; and, in response to the second operator initiating a second instance of the first instructional block, in the sequence of instructional blocks, presenting the first instruction, of the first instructional block, at the second operator device in a text format selected from the set of formats in Block S142. Additionally, this variation of the method S100 includes: accessing a second set of video feeds depicting the second operator performing the first instruction of the first instructional block in Block S150. Furthermore, this variation of the method S100 includes: detecting the first fiducial in a second frame from the second set of video feeds based on a second set of visual features extracted from the second frame in Block S152; interpreting presence of the first target object in the second set of video feeds based on the first fiducial in Block S154; and, in response to completion of the first instructional block, initiating a second instructional block in the first digital procedure in Block S160.

2. Applications

Generally, a computer system (e.g., a computer network, a local computer) can execute the method S100 to automatically develop and refine a digital procedure to include augmented reality content and automatic verification of steps of the procedure based on visual content captured during a first test instance of the digital procedure and limited real-time feedback from a (local or remote) secondary operator with limited or no pre- or post-production. The computer system can then publish this digital procedure for access by the same or other operators in the facility to accurately and repeatably reproduce the make line and/or manufacturing processes on the make line at a later time.

For example, a make line for a short, low-production pharmacological manufacturing run may be regularly constructed and deconstructed within a manufacturing facility and may necessitate accurate assembly of components and performance of production processes in order to achieve consistency of production batches over time. Accordingly, the computer system can execute the method S100 to generate a digital procedure—that contains augmented reality guidance for operators assembling and operating the make line and automatic checks to verify steps of this procedure—based on data collected in real-time during the first instance of this procedure and with selective, targeted, (near) real-time prompts to access additional augmentation or verification content.

3. Digital Draft Procedure

In one implementation, an operator affiliated with the facility loads an existing paper copy of a document outlining steps of a procedure for an equipment unit in the facility into an operator portal—hosted by the computer system, as described above—to create a digital form of this procedure. For example, the operator can scan the paper copy of the document with a smartphone, tablet, or dedicated scanner. Alternatively, the operator can directly access a digital (e.g., vectorized, digitized) copy of this document.

In this implementation, the operator portal (or the computer system) can implement text detection, recognition, and/or extraction techniques to automatically detect—in the digital copy of the document—text blocks (or "text descriptions") corresponding to individual steps in the procedure and to define individual steps of the procedure based on these text blocks. The operator portal (or the computer system) can also automatically interpret step numbers or step identifiers (e.g., 1, 2A-2C, 3.1-3.7, 4(A)-4(C), 5.1.$a$-5.4.$c$) for each of these steps and link or order these individual steps and their corresponding text blocks accordingly.

Additionally or alternatively, the operator portal can interface with the operator to isolate these text blocks and link these text blocks to individual steps. For example, the operator portal can interface with the operator to define individual steps or groups of steps as: prescribed (or "mandatory"); optional; or conditional (e.g., available or prescribed responsive to particular events or actions). The operator portal (or the computer system) can then generate a step tree for steps in the procedure based on these step definitions.

The operator portal can also interface with the operator to specify data input regions (or "capture fields," "input fields") in this digital copy of the document. For example, the operator can highlight input fields specifying manual recordkeeping in the digital copy, such as by highlighting a line or drawing a bounding box around a region in the digital copy of the document that specified recordation of a weight, pressure, temperature, density, or composition value read from a scale or dial on a machine or specifying recordation of a textual note. The operator can then link each highlighted input field in the digital copy to a data type or data class, such as: a numerical input value; a text or alphanumeric input value; an image; an audio recording; or a video recording.

The computer system can then implement methods and techniques described above to compile these data—including a text block for each step, input fields definitions for select steps, and an order or tree for these steps—into a digital draft procedure. The computer system can then interface with the operator or a team of operators—executing an exemplary instance of the procedure according to the digital draft procedure—to capture visual and special content representative of the procedure.

3.1 Generating the Digital Procedure

Blocks of the method S100 recite: initializing first digital procedure corresponding to a first procedure zone within a facility and containing a sequence of instructional blocks in Block S110; and populating a first instructional block, in the sequence of instructional blocks, with a first instruction in a first set of formats and a first set of target objects associated with performance of the first instruction in Block S120. Generally, the computer system can: ingest a paper-based procedure; identify steps in the paper-based procedure; extract instructions (e.g., text-based instructions) for steps in the paper-based procedure; aggregate other supportive content for these steps, such as in the form of images, audio, video, or augmented reality content; compile these data into individual instructional blocks containing instructions in different formats corresponding to different levels of human-targeted guidance; and then order these individual blocks or define a pathway for these individual blocks (in a decision tree) to generate a new digital procedure. Upon receipt of this digital procedure, a mobile device can execute Blocks of the method S100 to serve instructions in each block in the digital procedure to a user in select formats according to a current minimum instruction guidance specification for the digital procedure, assigned the individual user, or assigned globally to all users in the facility.

In one implementation described in U.S. application Ser. No. 17/719,120, the computer system can: access an electronic document for a procedure in a facility; and identify a sequence of steps specified in the electronic document. In this implementation, the computer system can, for each step in the sequence of steps: extract an instruction in the text format, corresponding to a first degree of guidance, for the step; initialize a block, in a set of blocks, for the step; and populate the block with the instruction in the text format for the step. The computer system can also, for a first step including a first instruction in the text format: access the first instruction depicted in a second format corresponding to a second degree of guidance different from the first degree; and access the first instruction depicted in a third format corresponding to a third degree of guidance greater than the first degree and the second degree. Furthermore, the computer system can: compile the set of blocks into the digital procedure according to an order of the sequence of steps defined in the electronic document; append a first block, in the digital procedure, corresponding to the first step with the first instruction depicted in the second format and the first instruction depicted in the third format; set a minimum instruction guidance specification—defining a minimum degree of guidance for the first instruction—for the first block; and serve the digital procedure to a mobile device for presentation of instructions in the set of blocks to a user in formats specified by a minimum instruction guidance specification.

In another implementation, the computer system can: extract a manifest of target objects (e.g., equipment units, raw materials) from the electronic document associated with performance of the sequence of steps; identify target objects in the manifest of target objects linked to performance of the instructions stored within the sequence of blocks; and append these target objects to each block in the sequence of blocks. For example, the computer system can: access an electronic document for a procedure designated for performance at the first procedure zone within the facility; and identify a sequence of steps specified in the electronic document. In this example, the computer system can, for a first step in the sequence of steps: extract the first instruction in the text format for the first step from the electronic document; extract a manifest of target objects defined in the first step; initialize the first instructional block in the sequence of instructional blocks; and populate the first instructional block with the first instruction in the text format and the manifest of target objects. Therefore, the computer system can: initialize an instance of the digital procedure containing the populated sequence of blocks; render instructions (e.g., in text format, audio format, video format, AR format) for performing the digital procedure at devices assigned to operators performing the instructions; and render target objects (e.g., list format, image format, AR format) at devices assigned to operators handling the target objects.

3.2 Loading the Digital Procedure

Blocks of the method S100 recite, at a second operator device associated with a second operator, accessing the first digital procedure in Block S140. Generally, a mobile device assigned to or carried by a user can access a digital procedure in preparation for the user performing a next instance of the digital procedure.

In one implementation, a user's mobile device automatically initializes a new instance of a digital procedure based on proximity of the mobile device to a machine, equipment, or location scheduled for the corresponding procedure. In this implementation, the mobile device can track its location and orientation within the facility. As the user approaches the machine in preparation for performing this procedure, the mobile device—worn or carried by the user—can track its location within the facility and identify a particular machine with which the user is interfacing based on this location. For example, the mobile device can: determine that the mobile device is occupying a particular campus based on the mobile device's current geospatial (e.g., GPS) coordinates; determine the building, floor, and/or room that the mobile device is occupying based on wireless (e.g., Wi-Fi) connectivity in the space occupied by the mobile device; and then compare features detected in images recorded by a camera on the mobile device to a 2D or 3D localization map of the building, floor, and/or room in the facility in order to determine the position and orientation of the mobile device in real space. In this example, the mobile device (or a computer system) can then query a map of machines throughout the facility for a particular machine adjacent and facing the mobile device—and therefore the user—based on the position and orientation of the mobile device in real space. Alternatively, the mobile device can identify the particular machine directly by matching a constellation of features detected in images recorded by the camera to a known, unique constellation of features associated with this particular machine.

For example, the mobile device can: track a location of the second operator device within the facility; detect a set of equipment units proximal the second operator device based on the location of the second operator device within the facility; retrieve a list of digital procedures, including the first digital procedure, associated with the first set of equipment units; serve the list of digital procedures on a display (e.g., visually render a list of procedures at the display) of the second operator device; and load the first digital procedure from a database to the second operator device in response to selection of the first digital procedure, from the list of digital procedures by the second operator.

The mobile device can regularly execute this process to monitor its position and orientation within the facility and detect machines nearby. Then, when the user stops for more than a threshold duration of time (e.g., ten seconds) or when the mobile device determines that its location has moved less than a threshold distance within a period of time (e.g., one meter in ten seconds), the mobile device can: query the digital procedure database for a digital procedure associated with a machine nearest the current position of the mobile device; and automatically load an instance of this digital procedure for this machine, such as if this annotator portal is scheduled for completion within a current time window.

In a similar implementation, the mobile device can: rank machines in the facility by proximity to the current location of the mobile device; render a list of these machines ordered by their rank on a display of the mobile device; prompt the user to select from the list; and download an instance of a particular digital procedure associated with a machine selected by the user. For example, the mobile device can: track its location within the facility; detect a set of machines nearby based on a map of the facility and the location of the mobile device within the facility; retrieve a list of digital procedures associated with this set of machines; render this list of digital procedures on a display of the mobile device; download a particular digital procedure from a database (e.g., a remote server via a wireless network) in response to the user selecting this particular digital procedure from the list of digital procedures; and then initialize a new, local instance of the particular digital procedure accordingly at the mobile device.

Alternatively, the user can manually select (or "pull") the particular machine directly from a dropdown list of machines or select the particular digital procedure directly from a dropdown list of digital procedures for all machines and equipment in the facility. The mobile device can then initialize a new, local instance of this digital procedure selected manually by the user.

4. Exemplary Instance of the Digital Draft Procedure

Blocks of the method S100 recite, in response to a first operator initiating a first instance of the first instructional block, in the sequence of instructional blocks, at the first procedure zone: accessing a first set of video feeds of a first operator performing the first instruction of the first instructional block in Block S130. Additionally, Blocks of the method S100 recite: accessing the first digital procedure in Block S140; and, in response to the second operator initiating a second instance of the first instructional block, in the sequence of instructional blocks presenting the first instruction, of the first instructional block, at the second operator device in a text format selected from the set of formats in Block S142.

Generally, the computer system can serve a first instance of the digital draft procedure to first and second devices carried by or otherwise associated with a primary operator and a secondary operator designated to perform this first instance of the digital draft procedure. The primary operator may then manually perform the steps described in the digital draft procedure while the secondary operator verifies the primary operator's actions, annotates the digital draft procedure, and/or captures additional visual data depicting steps of the procedure performed by the primary operator.

In particular, once the primary and secondary operators receive this first instance of the digital draft procedure at their first and second devices and confirm the start of this first instance of the digital draft procedure at her mobile device, the first and second devices can: immediately detect and track their absolute locations in the facility and/or their locations and orientations relative to nearby equipment; and record timeseries of their locations and orientations in the facility.

The first and second devices can also: initiate passive capture of audio feeds, video feeds, and/or depth map fees via integrated and/or connected sensors (e.g., microphones, color cameras, depth sensors in the first and second devices); present text blocks for the first step in the procedure, such as in an augmented reality environment rendered on a heads-up display or over a video feed rendered on a handheld display of the first and second devices; and record a start time of this first step.

If the first step is associated (e.g., preconfigured) with an input field (or a "capture field"), the first device can also:

prompt the primary operator to enter a value in a format corresponding to a type of the input field; record a value manually entered by the operator; flag a static image, a video snippet, and/or an audio clip recorded during this step or captured specifically around a time the primary operator manually entered this value; and store this value, static image, video snippet, and/or audio clip as an example of data captured for this first step of the procedure. Additionally or alternatively, if the first step is associated with an input field (or a "capture field"), the first device can: enable the primary operator to activate or locate a virtual pointer (e.g., an arrow, a caption box, a bounding box) within a virtual environment rendered on the first device (e.g., on the heads-up display or on a handheld display); prompt the primary operator to locate or align the virtual pointer with a readout or other display on the equipment unit; and register (i.e., locate) this virtual pointer—for the first step of the procedure accordingly—to this readout or display on the equipment unit specifically. For example, the first device can interface with the primary operator to locate a virtual three-dimensional arrow pointing toward a readout on the equipment unit and link this virtual pointer to the first text block containing a description of the first step in this procedure, such as by: rendering the video feed on the first device's display in real time; rendering the virtual three-dimensional arrow over the live video feed; and recording a persistent location of the virtual pointer relative to a reference feature on the equipment unit in response to selection of the reference feature by the first operator in the live video feed at the first device. Alternatively, the first device can register the virtual pointer to an absolute position in the facility or relative to the equipment unit more generally, such as by locating the virtual pointer in a localization map for the facility.

Similarly, if the first step of the procedure is associated with an input control specifying input by the primary operator into the equipment unit (or other machine nearby), the first device can: flag a static image, a video snippet, and/or an audio clip recorded during this step or captured specifically around a time the primary operator confirmed completion of this first step; and store this static image, video snippet, and/or audio clip as an example of input control for this first step of the procedure. The first device can also interface with the primary operator, such as described above, to locate a virtual pointer to an input control interface—corresponding to the input control specified in the first step—on the equipment unit (or nearby machine) and to record a link between this virtual pointer, its location relative to the equipment unit or facility more generally, and this first step.

The first device can additionally or alternatively prompt the primary operator to narrate her actions during the first step and can record an audio track and/or a video snippet of the primary operator narrating this step. The first device (or the computer system) can also convert the primary operator's speech to text and store this audio narration, video narration, and/or narration text in association with the first step. Additionally or alternatively, the second device can prompt the secondary operator to narrate the primary operator's actions during the first step and can record an audio track and/or a video snippet of the primary operator performing this step while the secondary operator narrates her actions. The second device (or the computer system) can also convert the secondary operator's speech to text and store this audio narration, video narration, and/or narration text in association with the first step.

The primary operator may then manually confirm completion of this first step at the first device. Accordingly, the first device can record a timestamp of this action, such as relative to the start time of this instance of the digital draft procedure, and then transition to a next step in the procedure. The first and second devices can then repeat the foregoing methods and techniques to record audio feeds, video feeds, timeseries of device (and therefore operator) locations, geotagged virtual pointers, narration data, and/or data for capture fields for each subsequent step in the first instance of the digital draft procedure.

The first and second devices can then upload these data to the computer system, which processes and compiles these data into a procedure file for this first instance of the digital draft procedure and generates an augmented digital procedure accordingly.

4.1 Additional Data: Augmented Reality Headset

In one variation, the primary operator wears an augmented reality headset and carries the first device during completion of the first instance of the digital draft procedure. In this variation, both the first device and the augmented reality headset capture location, visual, and/or audio data during the procedure. The computer system can then fuse visual data captured by the augmented reality headset with concurrent visual data captured by the first and second devices—based on absolute or relative positions and orientations of these devices—to generate a three-dimensional color representation of steps of the procedure.

In one example, the augmented reality headset can: retrieve instructions in an augmented reality format from the sequence of blocks in the digital procedure; and render guidance for the instructions in the augmented reality format at the augmented reality headset during performance of the instructions by the operator. In this example, the operator can initiate an instance of the digital procedure at the augmented reality headset. Subsequently, the augmented reality headset can: retrieve a first instructional block from the digital procedure; and receive selection of the first instruction in an augmented reality format. Furthermore, the augmented reality headset can: retrieve a live video feed from an optical sensor (e.g., color camera, infrared camera) at the augmented reality headset and defining a field of view for the operator; identify a target object of the first instructional block in the live video feed; and render the first instruction in the augmented reality format at a display of the headset device in a region depicting the first target object.

4.2 Additional Data: Other Sensors

In one variation, the computer system interfaces with other sensors deployed in the procedure zone to capture additional audible, visual, spatial, and/or other data of this first instance of the digital draft procedure by the first and second operators.

In one example, the primary and second operators perform the first instance of the digital draft procedure in a procedure studio that includes a set of (or a "suite") of color cameras, depth sensors, and/or multi-spectral optical sensors, such as fixedly mounted to a ceiling or wall of the procedure studio and/or mounted to mobile carts transiently located within the procedure studio. In another example, the primary and second operators perform the first instance of the digital draft procedure in a manufacturing area of the facility, which is outfitted with a set of fixed or mobile color cameras, depth sensors, and/or multi-spectral optical sensors.

In another example, the computer system can access video feeds from cameras at different locations within the facility, each capturing a field of view of the operator performing the digital procedure. In this example, the computer system can: access a first video feed from a first optical sensor mounted at the first procedure zone and defining a first field of view of the first operator performing the first instruction; access a second video feed from a second optical sensor located at a first headset device associated with the first operator and defining a second field of view of the first operator performing the first instruction; and access a third video feed from a third optical sensor of an autonomous cart proximal the first procedure zone and defining a third field of view of the first operator performing the first instruction. Thus, the computer system can aggregate these video feeds into a set of visual feeds to identify objects handled by the operator during performance of the digital procedure.

Accordingly, once the primary and secondary operators initiate the first instance of the digital draft procedure, the computer system can trigger these color cameras, depth sensors, and/or multi-spectral optical sensors to capture streams of color photographic images, depth maps, and/or multispectral images depicting the primary and secondary operators performing steps of the first instance of the digital draft procedure and machines, equipment, and materials involved in the procedure.

The computer system can then fuse these visual streams (e.g., color image and depth map feeds) with video feeds from the first and second devices carried by the primary and secondary operators during the first instance of the digital draft procedure to generate a three-dimensional color video feed of the first instance of the digital draft procedure. For example, the computer system can: stitch depth maps captured by the set of depth sensors into a feed of three-dimensional maps of the procedure studio based on known relative positions of the depth sensors; project concurrent color images—captured by the set of color cameras in the facility—onto the three-dimensional maps based on known positions of these color cameras relative to the depth sensors; project concurrent visual content captured by the first device during the first instance of the digital draft procedure to fill in gaps (i.e., selectively increase resolution) in regions of these three-dimensional maps—corresponding to the primary operator's areas of interest, effort, or action—based on tracked locations and orientations of the first device during the first instance of the digital draft procedure; and similarly, project concurrent visual content captured by the second device during the first instance of the digital draft procedure to fill in gaps in regions of these three-dimensional maps—corresponding to the secondary operator's areas of interest, effort, or guidance—based on tracked locations and orientations of the second device during the first instance of the digital draft procedure. The computer system can similarly augment this feed of three-dimensional maps depicting the first instance of the digital draft procedure with 2D and/or 3D visual content captured by an augmented reality headset and/or other mobile devices carried or worn by the primary and secondary operators during the first instance of the digital draft procedure.

Therefore, the computer system can: compile depth data from (fixed or mobile) overhead optical sensors in the facility into a timeseries three-dimensional representation of a space in the facility in which the primary and secondary operators performed the first instance of the digital draft procedure; augment this timeseries three-dimensional representation of the space with color and/or multispectral data captured by other 2D optical sensors arranged in the space; and further augment timeseries three-dimensional representations of the space with higher-resolution color data captured by the first and second devices—worn or carried by the primary and secondary operators performing and verifying critical or target actions at each step—during the first instance of the digital draft procedure. Accordingly, the computer system can compile these data into a variable-resolution three-dimensional representation of the space during the first instance of the digital draft procedure, which visual and/or spatial highest resolution in areas corresponding to critical or target actions at each step of the procedure.

However, the computer system can aggregate and/or compile two- or three-dimensional visual content—captured during the first instance of the digital draft procedure—in any other way.

5. Step Augmentation

Blocks of the method S100 recite: identifying a first target object, from the first set of target objects in the first instructional block, in a target frame from the first set of video feeds in Block S132; extracting a first set of visual features from the target frame in the first set of video feeds depicting the first target object; and calculating an identification score for the first target object depicted in the first set of video feeds based on the first set of visual features in Block S134. Furthermore, Blocks of the method 100 recite: in response to the first identification score falling below a target confidence threshold, applying a first fiducial to the first target object in Block S136; and linking the first target object to the first fiducial in the first instructional block in Block S138.

Generally, the computer system can interface with a user (e.g., the secondary operator, a remote operator) to augment steps of the procedure with visual content and visual checks. In particular, the method S100 is described below as executed in real-time by the computer system in conjunction with the secondary operator via the second device. In particular, the computer system can: render frames of the set of video feeds to a device associated with the second operator; and receive selections from the second operator identifying objects depicted in the set of video feeds. Thus, the computer system can then: calculate an identification score for these objects identified by the second operator based on visual features extracted from video feeds rendered to the second operator; and, in response to the identification score falling below a confidence threshold, prompt the second operator to apply a fiducial (e.g., barcode) to the equipment unit. The computer system can then link the applied fiducial to the identified object in the digital procedure. Thus, during subsequent performance of the digital procedure by operators within the facility, the computer system can confidently identify objects pertinent to the performance of the digital procedure by detecting presence of the fiducial applied to the object. However, the method S100 can additionally or alternatively be executed by the computer system or other local device post hoc after completion of the first instance of the digital draft procedure, such as by the primary operator, the secondary operator, or another local or remote operator.

5.1 First Step: Object Detection

In one implementation, the computer system interfaces with the secondary operator in real-time during the first instance of the digital draft procedure to manually label objects of interest in visual feeds captured by sensors in the facility during the first instance of the digital draft procedure. In this implementation, for a first step of the procedure, the computer system: accesses (e.g., retrieves, streams) a first video clip captured by the first device during completion of the first step (i.e., bounded by timestamps at the start and completion of the first step) by the primary operator during the first instance of the digital draft procedure; accesses a second, concurrent video clip captured by the second device; and accesses a concurrent video and/or depth map feeds captured by other sensors facing the procedure zone. The computer system then compiles these data into a first set of visual feeds of the step of the digital draft procedure, such as: discrete visual feeds depicting completion of the first step of the digital draft procedure from different perspectives within the procedure zone; or a 3D representation (e.g., a feed or compiled and colorized depth maps) of objects moving within the procedure zone during the first step of the procedure.

The computer system can then implement object detection and object tracking techniques to identify static and moving objects within this first set of visual feeds.

5.2 First Step: Target Objects

The computer system can then prompt the secondary operator to select a set of set of target objects in the first set of visual feeds, such as by selecting these objects directly within the first set of visual feeds—replayed on a local display—as these target objects come into view during the first step of the procedure.

Additionally or alternatively, in this implementation, the computer system can: automatically highlight objects moving within the procedure zone; and prompt the secondary operator to confirm or mute these moving objects at target objects for the first step of the procedure.

5.3 First Step: Target Configurations

The computer system can then interface with the secondary operator to indicate a sequence of target configurations of a set of target objects in the procedure zone that corresponds to completion of key sub-steps in the first step. In particular, the secondary operator can select a particular subset of 2D or 3D frames—in the first set of visual feeds—that depict target configurations of target objects in the procedure zone that correspond to completion of the entire first step and/or sub-steps therein.

In one example, the computer system can: at a second operator device associated with a second operator, access the first set of video feeds depicting the first operator performing the first instruction; and receive selection of the first target object in the target frame from the second operator at the second operator device. In this example, while the secondary operator views the primary operator performing the first step of the procedure, the secondary operator may: select text blocks—rendered on the second device and containing descriptions of the first step and sub-steps contained therein—to indicate completion of the first step or sub-steps; or depress a foot pedal to sequence through sub-steps of and then the entirety of the first step of the procedure. Accordingly, the computer system can: retrieve a frame (or burst of frames) in the first set of visual feeds concurrent with this input from the secondary operator indicating completion of a sub-step of the first step; and prompt the user to confirm a set of objects—newly or previously identified—as target objects critical to this target configuration and corresponding sub-step. The computer system can then: extract features of these target objects in the target configuration; and store these features as identifying characteristics of target objects in this target configuration. During a later instance of the procedure, the computer system can: extract features from visual feeds captured by optical sensors in the procedure zone; and then compare extracted features of these objects to identifying characteristics of target objects defined for this target configuration to confirm presence of these target objects in the target configuration according to the first step of the procedure.

However, the first set of visual feeds captured during the first instance of the digital draft procedure may be insufficient to fully prescribe characteristics of these target objects, such as due to: lack of distinct features in a frame depicting a target object in the target configuration; insufficient resolution of a target object depicted in the frame; and/or obfuscation of a target object by other objects in the procedure zone. Additionally or alternatively, if the computer system identifies insufficient information in the first set of visual feeds to fully prescribe a target object in a target configuration during the first instance of the digital draft procedure, the computer system can predict similar absence of sufficient visual data to positively confirm presence of an analogous target object in this target configuration in a future instance of the procedure.

Therefore, the computer system can: selectively interface with the secondary operator to retrieve additional content (e.g., a three-dimensional model) fully prescribing characteristics of a target object; configure additional sub-steps in the first step of the procedure to enable access to greater identifying data to enable the computer system to accurately identify the target object during a future instance of the procedure; configure the first step of the procedure to enable access to greater identifying data for positively identifying the target object in a future instance of the procedure; or configure the first step of the procedure for manual verification of presence of the target object during a future instance of the procedure.

5.4 First Step: Object Re-Recognition for Presence of Target Objects

Blocks of the Method S100 recite: accessing a second set of video feeds depicting the second operator performing the first instruction of the first instructional block in Block S150; detecting the first fiducial in a second frame from the second set of video feeds based on a second set of visual features extracted from the second frame in Block S152; and interpreting presence of the first target object in the second set of video feeds based on the first fiducial in Block S154. Generally, the computer system can execute blocks of the method S100 to interpret presence of target objects during performance of the digital procedure based on detecting the applied fiducial on the target objects in the video feeds depicting the performance of the digital procedure.

The computer system can then: process a frame (or sequence of frames) depicting a target configuration to predict accuracy with which the computer system may detect and confirm presence of target objects in the target configuration in a future instance of the procedure performed under similar lighting and imaging conditions; and generate recommendations for creating intermediate sub-steps of the procedure, uploading additional object content (e.g., three-dimensional models), or queuing validation by another local or remote operator during the first step of the procedure in order to increase probability of accurate target object detection and presence confirmation in future instances of the procedure.

In one implementation, once the secondary operator identifies a first target object and a first target configuration, the computer system can: implement object tracking techniques to track the first target object through the remainder of the first step of the procedure (or through the remainder of the procedure more generally) in the first set of visual feeds; implement object tracking techniques to track the first target object back through prior frames of the first set of visual feeds; and scan frames in the first set of visual feeds—prior to and succeeding the target frame depicting the first target—for other objects exhibiting characteristics similar or analogous to the first target object. The computer system can then characterize a confidence that the computer system can uniquely identify and track the first target object up to the first target configuration during the first step of the procedure, such as: inversely proportional to a quantity of objects exhibiting characteristics very similar to the first target object in the set of visual feeds leading up to and at the target configuration; proportional to a contiguous duration of time that the first target object is visible in the first set of visual feeds leading up to the first target frame; and/or proportional to a scope (e.g., a proportion of a total surface area) of the first top visible in the first target frame and/or frames immediately preceding the first target frame.

5.4.1 High Re-Recognition Confidence

Then, if this confidence is high, the computer system can confirm object re-recognition for the first target object and lack of need for additional information or content to recognize the first target object. Accordingly, the computer system can: extract characteristics of the target object from the target frame depicting this target configuration; compile these characteristics into a definition of the target object; and store these characteristics in conjunction with the first step of the procedure. During a later instance of the procedure, the computer system can identify the target object (or an analogous object) in the procedure zone based on alignment (e.g., similarity) between these store characteristics of the target object and features extracted from visual feeds captured during this first step of the later instance of the procedure.

5.4.2 Moderate Re-Recognition Confidence: Minimal Distinguishing Target Object Features Alternatively, if this confidence is moderate and/or if the first target object exhibits limited identifying features in the first set of visual feeds upon entering the first target configuration, the computer system can prompt application of a secondary identifying indicia onto the first target object. If the secondary operator confirms this prompt, the computer system can: isolate a target region of a first target object visible in the first target configuration in the first set of visual feeds; generate an additional sub-step, in first step of the procedure, specifying a) application of a secondary identifying indicia (e.g., an adhesive-backed barcode) onto the target region of first target object and b) scanning the secondary identifying indicia into a device in the procedure zone to link the secondary identifying indicia to the first target object; and write a flag to the first step to identify the first target object—particularly in the first target configuration—according to the secondary identifying indicia.

For example, the computer system can execute this process to incorporate a sub-step—of the first step of the procedure—to add an adhesive-backed barcode to a planar surface characterized by limited distinguishing features (e.g., a large, flat table) in the fields of view of optical sensors in the procedure zone. The computer system can also populate the new sub-step with an augment reality overlay indicating a target location of the adhesive-backed barcode on the surface that remains in the field of view of a camera worn or carried by the primary operator as the primary operator completes the first step of the procedure. The computer system can then: prompt the primary operator—via the first device—to restart the first step and/or perform the new sub-step(s) of the first step of the procedure; detect and track the new secondary identifying indicia on the first target object in subsequent frames of the first set of visual feeds; execute methods and techniques described above to re-characterize confidence in accurately identifying the first target object in the first target configuration further based on the secondary identifying indicia; confirm that addition of secondary identifying indicia to the first target object is sufficient to detect and verify the first target object in the first set of visual feeds upon entering the first target configuration if the resulting confidence exceeds a threshold confidence; or execute other methods and techniques described herein if this confidence remains below the threshold confidence.

Thus, during a later instance of the procedure, the computer system can identify the target object (or an analogous object) in the procedure zone based on secondary identifying indicia read from an object detected in visual feeds captured during this first step of the later instance of the procedure.

5.4.3 Moderate Re-Recognition Confidence: Target Object Partially Obfuscated

Additionally or alternatively, if this confidence is moderate and/or if only a moderate proportion of the first target object is visible in the first set of visual feeds in the first target configuration and leading up to the first target configuration, the computer system can prompt the secondary operator to supply ground truth visual data representing the first target object, which the computer system can link or load into the first step of the procedure to enable the computer system to positively detect and identify the first target object in future instances of the procedure.

For example if the secondary operator confirms this prompt, the computer system can: interface with the secondary operator to upload a three-dimensional model of the first target object; and link this three-dimensional model to the first step of the procedure and to the first target object. The computer system can then: retrieve a target frame depicting the first target configuration; detect a set of discrete objects in the target frame; and calculate a set of projections that map (or "snap") corners, edges, and surfaces defined in the three-dimensional model of the first target object to corners, edges, and surfaces of objects detected in the target frame. If the computer system identifies a single solution for which the three-dimensional model of the first target object aligns to a discrete object in the target frame, the computer system can confirm that access to the model is sufficient to enable the computer system to identify the first target object in the first target configuration from visual feeds of the procedure zone.

Then, during a later instance of the procedure, the computer system can: characterize a difference between (e.g., a cumulate distance between surfaces and edges of) an object detected in visual feeds captured during this first step of the later instance of the procedure and this three-dimensional model of the target object; and identify the object as the target object prescribed in the sub-step of the first step of the procedure if this difference is less than a threshold distance.

Otherwise, the computer system can further implement methods and techniques described above to add a sub-step to the first step of the procedure that specifies application of secondary indicia (e.g., a pair of offset, adhesive-backed barcodes) to a visible region of the first target object—in the first set of visual feeds when the first target object enters the first target configuration. Then, during a later instance of the procedure, the computer system can detect and confirm presence of the first target object (or an analogous object) in the first target configuration based on secondary indicia (e.g., in addition to or instead of the three-dimensional model of the first target object) detected on the first target object in visual feeds of the procedure zone.

5.4.4 Low or Null Re-Recognition Confidence: Target Object Partially Obfuscated

Additionally or alternatively, if this confidence is low and/or if the first target object is mostly or fully obfuscated in the first set of visual feeds upon reaching the first target configuration, the computer system can prompt the user to define a new intermediate configuration—preceding the target configuration—in which the first target object is visible in the first set of visual feeds, such as by selecting an additional frame preceding the target frame in the first set of video feeds and depicting the new intermediate configuration. The computer system then executes the foregoing processes to characterize identification accuracy of the first target object and verification of the intermediate configuration with data contained in the additional frame.

Upon confirming high confidence in identification of the first target object and verification of the intermediate configuration, the computer system can: insert a new sub-step into the first step of the procedure; define the intermediate configuration in the new sub-step; and prompt the primary operator to perform the new intermediate configuration or repeat the first step generally. The computer system can repeat the foregoing processes to verify identification of the first target object according to the new sub-step.

During a later instance of the procedure, the computer system can: detect and confirm presence of the first target object (or an analogous object) in the intermediate configuration based on features extracted from visual feeds of the procedure zone; track the object from the intermediate configuration to the target configuration; and confirm presence of the target object in the target configuration accordingly.

Alternatively, in this implementation, if the computer system or the secondary operator fails to identify a viable intermediate configuration, the computer system can instead automatically label the target configuration or the first step of the procedure more generally for manual, real-time verification by a local or remote verifier before permitting access to a next step of the procedure. Then, during a later instance of the procedure, the computer system can transmit a prompt to a second operator—such as a local or remote verifier—to confirm presence of the target object in the procedure zone during the first sub-step of the first step before permitting a primary operator to move to a next step or sub-step of the procedure.

5.4.5 Other Target Configurations and Target Objects

The computer system can repeat this process for each other target configuration defined within the first step and containing the first target object in order to increase detection and verification accuracy for presence of the first target object in these target configurations of the first step during a future instance of the procedure. The computer system can further repeat this process to verify identification of each other target object identified in each target configuration defined within the first step.

5.4.6 Unique Target Object Identification from Set of Like Objects

In one variation, the computer system: characterizes probability of conflating two similar objects in the procedure zone and confirming presence of a target object based on an incorrect object in the procedure zone based on characteristics of objects detected in the first set of visual feeds; and then selectively interfaces with the secondary operator to modify the first set of the procedure accordingly. In particular, the computer system can detect multiple similar objects in a frame representing a target configuration, such as multiple o-rings of similar sizes, shapes, profiles, and colors. If the user identifies a target object—from the set of similar objects—in the frame, the computer system can verify unique detection, tracking, and identification of the target object.

In one implementation, if these object are indistinguishable in the frame but the target object exhibits a region that is visible in the frame and of sufficient size for labeling with secondary indicia (e.g., an adhesive-backed barcode), the computer system can: implement methods and techniques described above to prompt the secondary operator to apply secondary indicia to the target object and to insert a corresponding subset into the first step of the procedure; and then identify the target object in the procedure zone during a later instance of the procedure based on such secondary indicia.

In this implementation, if these objects are indistinguishable in the frame and the target object does not exhibit a region of sufficient size to house secondary indicia or if the secondary operator indicates that secondary indicia are not possible for the target object (e.g., the visible region is sterile material processing surface or a machine mating surface). The computer system can instead implement methods and techniques described above to prompt the user to define a new intermediate configuration—preceding the target configuration—in which the first target object is visible and distinguishable from these other similar objects in first set of visual feeds, such as by selecting an additional frame preceding the target frame in the first set of video feeds and depicting the new intermediate configuration.

The computer system can then: confirm unique identification of the target object in the intermediate frame, such as based on a stored three-dimensional model of the target object as described below; track the object in the first set of visual feeds from the intermediate configuration to the target configuration; confirm that the target object remains visible in the first set of visual feeds from the intermediate configuration to the target configuration; define a new sub-step—including the intermediate configuration—in the procedure; prompt the primary operator to perform the new intermediate configuration or repeat the first step generally; and verify identification of the first target object in the intermediate configuration and tracking of the target object to the target configuration according to the new sub-step of the procedure.

Thus, during a later instance of the procedure, the computer system can: identify the target object in the procedure zone during a later instance of the procedure based on features extracted from visual feeds of the procedure zone depicting the intermediate configuration; track the target object to the target configuration; and confirm presence of the target object in the target configuration accordingly.

Furthermore, in this implementation, if the target object leaves (or is represented at less than a minimum resolution) in the first set of visual feeds between the intermediate and target configurations, the computer system can automatically label the target configuration or the first step of the procedure more generally for manual, real-time verification by a local or remote verifier before permitting access to a next step of the procedure.

Then, during a later instance of the procedure, the computer system can transmit a prompt to a second operator—such as a local or remote verifier—to confirm presence of the target object in the procedure zone during the first sub-step of the first step before permitting a primary operator to move to a next step or sub-step of the procedure.

5.4.7 Identification Score

In one implementation, the computer system can: extract visual features from the set of video feeds depicting the operator performing the digital procedure; and implement techniques described above to calculate an identification score for target objects representing a degree of confidence in identifying the target objects depicted in the video feed. In this implementation, the computer system can: derive unique characteristics (e.g., object size, object constellation, fiducials) of target objects depicted in the video feeds based on visual features extracted from regions depicting the target objects in the video feeds; and link these unique characteristics to target object types defined in the digital procedure. Subsequently, the computer system can: calculate the identification score for a target object based on correlations of these derived unique characteristics to baseline characteristics defined in the digital procedure; and compare the identification score to a confidence threshold defined for the target object in the digital procedure. Thus, in response to the identification score deviating from the confidence threshold, the computer system can generate a prompt to the operator to apply a unique fiducial to the target object and/or request the operator to manually confirm presence of the target object. Alternatively, in response to the identification score falling within the confidence threshold, the computer system can link the derived unique characteristics to target objects depicted in the video feed in the digital procedure.

In one example, the computer system can: generate a bounding box in a region of the target frame extracted from the video feeds depicting the target object; extract a set of visual features from the region encompassed by the bounding box; and derive an object constellation for the target object (e.g., a flask) based on this set of visual features. Furthermore, the computer system can then: query a set of object constellations associated with the set of target objects defined in the digital procedure; and calculate the identification score based on deviations of the derived object constellation from a target object constellation in the set of object constellations. Therefore, the computer system can: autonomously output identification scores for target objects handled by an operator during performance of the digital procedure; and confirm presence of target objects handled by the operator with minimal manual input by the operator.

In another example, the computer system can additionally or alternatively calculate the identification score for target objects based on sizes, shapes, profiles, and colors extracted from the video feeds.

5.5 First Step: Relative Object Position in Target Configuration

In one variation, the computer system: interfaces with the secondary operator—via the second device—to: define sensitivity of relative positions (e.g., relative locations and orientations) of target objects in a target configuration; and then modify the first step of the procedure to enable automatic verification and/or prompt manual verification of relative positions of target objects in the target configuration.

In particular, the computer system can: extract relative positions of target objects in a target configuration in the first step directly from a target frame—in the first set of visual feeds—depicting this target configuration; and store these relative positions as target positions of target objects in this target configuration. During a later instance of the procedure, the computer system can: extract features from visual feeds captured by optical sensors in the procedure zone; identify target objects and estimate their relative positions in the procedure zone based on these features; and then compare the relative positions of these target objects to the target positions of target objects stored in this target configuration to confirm accurate completion of the first step of the procedure.

However, the first set of visual feeds captured during the first instance of the digital draft procedure may be insufficient to inform target positions of target objects in a target configuration with requisite accuracy to inform accurate and repeatable verification of the first step of the procedure. Therefore, the computer system can: interface with the user to identify target configurations requiring verification of target object positions with greater accuracy; selectively retrieve additional content (e.g., a three-dimensional model) to enable automatic verification of target configurations in future instances of the procedure; configure additional substeps of the procedure; and/or insert triggers for manual verification into the first step of the procedure.

In one implementation, the computer system can populate a block—in the sequence of blocks—in the digital procedure with a set of target configurations associated with a set of target objects stored in the digital procedure. For example, the computer system can extract these target configurations from an electronic digital document representing steps of a process and/or receive manual input of these target configurations during performance of the digital procedure by the primary operator. Subsequently, the computer system can: identify a target object in a target frame from a set of video feeds depicting the operator performing the digital procedure; extract a relative position of the target object from this target frame; and store this relative position as a target configuration for the target object in a corresponding block of the digital procedure. In one example, the computer system can: generate a bounding box about the target object in the target frame; and extract a set of coordinate points for the bounding box representing the position of the bounding box in the target frame.

Subsequently, in this implementation, a different operator performing the digital procedure can access the digital procedure containing the target configuration for the target object. Thus, in response to initiating the digital procedure, the computer system can: render an instruction—depicting the target configuration—for a block in the digital procedure at an operator device; access a set of video feeds of this operator performing the instruction depicting a target object defined in the digital procedure; extract a set of visual features from the set of video feeds; and interpret a second relative position of the target object based on this extracted set of visual features. Furthermore, the computer system can: in response to the second relative position deviating from the target configuration defined in the digital procedure, generate a prompt for the operator to adjust the current relative position of the target object to the target configuration; and serve this prompt to a device associated with the operator.

5.5.1 First Step: General Object Positional Sensitivity

In one implementation, in response to the secondary operator identifying a target configuration, within the first step of the procedure, the computer system prompts the secondary operator to indicate positional sensitivity of target objects in the target configuration.

For example, a first target configuration in the first step can include collection of components for a subassembly on a work surface; accordingly, the secondary operator can label the first target configuration with low or no positional sensitivity. In this example a second target configuration in the first step can include loose assembly of components in this subassembly; accordingly, the secondary operator can label the first target configuration with moderate positional sensitivity. In this example, a third and final target configuration in the first step can include tight, final assembly of components in this subassembly; accordingly, the secondary operator can label the first target configuration with high positional sensitivity.

Generally, a target object assigned greater positioned sensitivity may require visibility of a greater proportion of each target object. Thus, if the target frame depicting the target configuration contains insufficient visual information to prescribe the set of target objects and their relative positions, the computer system can: interface with the secondary operator to segment the target configuration into a sequence of intermediate configurations, each containing a subset of target objects characterized by greater visual access in visual feeds captured by the optical sensors in the procedure zone; define an intermediate step—within the first step—that defines an intermediate configuration in which a target object obscured in the target configuration is more visible; retrieve a frame—depicting the intermediate configuration—in the first set of visual feeds, such as based on manual selection of this frame from the first set of visual feeds by the secondary operator; extract a first set of characteristics prescribing target objects and their relative positions in this frame; define this first set of characteristics as a first target feature constellation for this intermediate configuration; and characterize possible error between the first target feature constellation and features extracted from the frame depicting the intermediate configuration. Similarly, the computer system can: extract a second set of characteristics prescribing target objects and their relative positions in the target frame depicting the target configuration; define this second set of characteristics as a second target feature constellation for this target configuration; and re-characterize possible error between the second target feature constellation and features—extracted from the target frame depicting the target configuration—representing the combination of the intermediate configuration generally (rather than individual target objects) and other target objects that collectively define the target configuration.

In this implementation, if a combination of the first and second error is less than a threshold error, the computer system can: confirm the intermediate configuration; insert a subset—defining the intermediate configuration—into the procedure; store the first set of characteristics as a first definition of presence and relative positions of target objects in the intermediate configuration; and store the second set of characteristics as a second definition of presence and relative positions of target objects in the target configuration. Then, during a later instance of the procedure, the computer system can extract a first set of features from a first frame—captured by optical sensors in the procedure zone—depicting the intermediate configuration; confirm presence and orientation of target objects in the intermediate configuration based on alignment between the first set of features and the first definition stored of the corresponding sub-step of the procedure; extract a second set of features from a second frame—captured by optical sensors in the procedure zone—depicting the target configuration; and confirm presence and orientation of target objects in the target configuration based on alignment between the second set of features and the second definition stored of the corresponding first step of the procedure.

Alternatively, if the computer system detects insufficient visual content to derive relative positions of target objects within the intermediate configuration, the computer system can prompt the secondary operator to supply a three-dimensional model of the intermediate configuration. Upon receipt of the three-dimensional model from the secondary operator, the computer system can: retrieve a target frame depicting the intermediate configuration during the first instance of the digital draft procedure; detect a set of discrete objects in the target frame; calculate a set of projections that map (or "snap") corners, edges, and surfaces defined in the three-dimensional model of the intermediate configuration to corners, edges, and surfaces of objects detected in the target frame; and characterize possible error in confirming the intermediate configuration according to the three-dimensional model based on cumulative error between these features in the frame and the three-dimensional model across this set of projections.

Then, if this possible error is less than a threshold error, the computer system can: confirm that the three-dimensional model is sufficient to enable the computer system to confirm relative positions of target objects—in the procedure zone—according to the intermediate configuration; insert a sub-step for the intermediate configuration into the procedure; and link the three-dimensional model to this sub-step of the procedure.

Accordingly, during a later instance of the procedure, the computer system can implement methods and techniques described above to confirm the intermediate configuration based on this three-dimensional model and features extracted from visual feeds captured during this instance of the procedure. The computer system can similarly link a three-dimensional model of the target configuration to the corresponding sub-step of the procedure and implement this three-dimensional model during a later instance of the procedure to verify this target configuration.

Yet alternatively, if the secondary operator declines access to a three-dimensional model of the intermediate or target configuration (e.g., if a three-dimensional model thereof is not available), the computer system can automatically label the target configuration or the first step of the procedure more generally for manual, real-time verification by a local or remote verifier before permitting access to a next step of the procedure. Then, during a later instance of the procedure, the computer system can transmit a prompt to a second operator—such as a local or remote verifier—to confirm presence of the target object in the procedure zone during the first sub-step of the first step before permitting a primary operator to move to a next step or sub-step of the procedure.

5.5.2 First Step: Specific Relative Object Positional Sensitivity

In one variation, the computer system interfaces with the secondary operator to specifically identify a subset of target objects—in the first target configuration—characterized by positional sensitivity, such as: an o-ring and an o-ring groove of a threaded component; a hose end and a hose; or a sensor probe housing and a sensor receptacle in a production chamber.

The computer system can then execute the foregoing methods and techniques to selectively retrieve and/or verify access to sufficient data to verify the relative positions of particular target objects in the procedure zone during the first step of the procedure.

5.5.2 First Step: Linear and Angular Offset Sensitivity

Additionally or alternatively, the computer system can prompt the secondary operator to indicate whether positional sensitivity of target objects is (predominantly) angular or linear along one or more axes of the target objects.

Generally, the computer system may characterize an angular offset between two target objects along a particular axis with high accuracy if the particular axis is parallel to a focal axis of an optical sensor in the procedure zone and/or if the target objects include asymmetric features that are offset from the particular axis and visible in the first set of visual feeds; and vice versa.

Accordingly, if the secondary operator indicates critical angular offset between two target objects in a target configuration in the first step of the procedure, the computer system can characterize viability of defining angular offset between the target objects for future instances of the procedure—based solely on features extracted from the first set of visual feeds—based on positions of these target objects in the first set of visual feeds and the geometries of these target objects.

In particular, the computer system can characterize a confidence in accurately defining a relative angular offset between the target objects during the first frame and verifying angular offset between analogous objects during a future instance of the procedure based on: relative positions of these target objects in the first set of visual feeds; proportions of these target objects visible in the target frame depicting the target configuration; and resolutions of these target objects in the target frame; etc. The computer system can then selectively configure the target configuration in the first step of the procedure based on this confidence.

In particular, if this confidence is high, the computer system can: extract features representing the relative angular positions of the target objects from the target frame depicting the target configuration; store and link this set of features to the first step of the procedure; and confirm the relative positions of analogous objects during a future instance of the procedure based on these stored features.

If this confidence is moderate, the computer system can define an intermediate configuration—for the first step—in which the relative positions of the target objects are more visible in the visual feeds captured within the procedure zone. Additionally or alternatively, the computer system can access a three-dimensional model defining the angular positions of these target objects in the procedure zone; and link this three-dimensional model to the first step of the procedure.

Furthermore, if this confidence is low, the computer system can: update the procedure to specify placement of another optical sensor in the procedure zone to enable access to visual data that better depicts the relative angular positions of these target objects; or automatically label the target configuration or the first step of the procedure more generally for manual, real-time verification of the relative angular positions of the target objects by a local or remote verifier before permitting access to a next step of the procedure.

Additionally or alternatively, if this confidence is low, the computer system can implement methods and techniques described above to: add a sub-step to the first step of the procedure that specifies application of secondary indicia (e.g., adhesive-backed barcodes) to visible regions of the target objects in the target configuration; extract a relative offset (or "offset window") between the target objects from the target frame depicting the target configuration during the first instance of the digital draft procedure; and store and link this relative offset in the first step of the procedure. During a later instance of the procedure, the computer system can: prompt an operator to locate secondary indicia on objects analogous to the target object prescribed in the first step of the procedure; detect and register these secondary indicia on these objects; characterize relative positions of these secondary indicia on their corresponding objects; characterize an offset between these objects based on positions of these secondary indicia in visual feeds captured during this later instance of the procedure and the relative positions of these secondary indicia; and verify the first step of this instance of the procedure if this offset approximates the stored relative offset (or falls within the offset window) stored in this step of the procedure.

Similarly, the computer system may characterize a linear offset between two target objects along a particular axis with high accuracy if the particular axis is perpendicular to a focal axis of an optical sensor in the procedure zone; and vice versa. Accordingly, if the secondary operator indicates critical linear offset between two target objects in a target configuration in the first step of the procedure, the computer system can characterize viability of defining linear offset between the target objects for future instances of the procedure—based solely on features extracted from the first set of visual feeds—based on positions of these target objects in the first set of visual feeds. The computer system can then selectively configure the target configuration in the first step of the procedure based on this confidence, such as by implementing methods and techniques similar to those described above.

5.5.4 First Step: Positional Tolerance

In one variation, the computer system: estimates a range of possible angular and/or linear offsets between two target objects in the target configuration based on locations and scopes (e.g., proportions of total surface areas) of these target objects detected in the first set of visual feeds of the first step of the procedure; stores this range as a relative position tolerance for the target configuration; and presents this tolerance to the secondary operator.

If the secondary operator confirms this tolerance, the computer system can store this tolerance in the first step without requesting additional data or prompting further action.

If the secondary operator indicates need for tighter position tolerance of these target objects, the computer system can amend the first step of the procedure with incrementally more intrusive modifications, such as: prompting the secondary operator to supply a three-dimensional model of the target configuration; generating a sub-step to locate an additional optical sensor in the procedure zone; and generating a sub-step to add secondary indicia to these target objects. The computer system can then: interface with the primary operator to repeat the first step of the first instance of the digital draft procedure based on these modifications to the first step; update the position tolerance calculated for the target objects in the target configuration of the first step; interface with the secondary operator to confirm this position tolerance; and then confirm changes to the first step of the procedure accordingly.

5.6 Target Object Trajectory

In one variation, the computer system: interfaces with the secondary operator—via the second device—to: define sensitivity of the trajectory of a target object during the first step of the procedure, such as relative to a reference object or surface; and then modifies the first step of the procedure to enable automatic verification and/or prompt manual verification of the trajectory of a target object during the first step of an instance of the procedure.

In particular, the computer system can: implement methods and techniques described above to track the location and orientation of a target object relative to a second object in the first set of visual feeds; extract a set of target features defining the target object from the first set of visual feeds; extract a set of reference features defining the reference object from the first set of visual feeds; and store the target trajectory of the target object—defined relative to the set of reference features—in the first step of the procedure.

Then, during a later instance of the procedure, the computer system can: extract features from visual feeds captured by optical sensors in the procedure zone; identify a first object analogous to the target object based on these extracted features and the target features defined in the first step of the procedure; identify a second object analogous to the reference object based on these extracted features and the reference features stored in the first step of the procedure; track the first and second objects in these visual feeds to estimate the trajectory of the first object relative to the second object; and then compare the relative trajectory of the first object to the target trajectory defined in the first step of the procedure to confirm accurate motion of the first object and accurate completion of the first step of the procedure.

However, the first set of visual feeds captured during the first instance of the digital draft procedure may be insufficient to inform trajectory of the target object relative to the reference object with requisite accuracy to inform accurate and repeatable verification of the first step of the procedure. Therefore, the computer system can: selectively retrieve additional content (e.g., a three-dimensional model) to enable automatic verification of target configurations in future instances of the procedure; configure additional substeps of the procedure; and/or insert triggers for manual verification into the first step of the procedure.

For example, the computer system can: track the target object in the first set of visual feeds depicting the first step of the first instance of the digital draft procedure; extract a range of possible positions of the target object within the procedure zone from each frame in the first set of visual feeds; extract a range of possible orientations of the target object within the procedure zone from each frame in the first set of visual feeds; compile ranges of possible positions and orientations of the target object in the procedure zone into a range of possible paths of the target object during the first step of the first instance of the digital draft procedure, such as in the form of a sequence of keypoints describing linear and angular positions of the target object in the procedure zone; and present (e.g., render) the range of possible paths of the target object to the secondary operator.

In this example, if the secondary operator indicates that this range of possible paths of the target object is sufficient to prescribe motion of the target object during the first instance of the digital draft procedure—and analogous objects during future instances of the procedure—the computer system can store this range of possible paths of the target object as a target trajectory of the target object in the first step of the procedure. During a later instance of the procedure, the computer system can then implement similar methods and techniques to: detect an object analogous to the target object in visual feeds of the procedure zone; track the object in the procedure zone; extract a range of possible positions of the object within the procedure zone from frames in these visual feeds; extract a range of possible orientations of the object within the procedure zone from frames in these visual feeds; compile ranges of possible positions and orientations of the object in the procedure zone into a range of possible paths of the object during the first step of this later instance of the procedure; confirm that this range of possible paths of the object falls within the target trajectory prescribed for the object in the first step of the procedure; and verify completion of the first step of this later instance of the procedure accordingly.

However, if the secondary operator indicates that the range of possible paths of the target object is insufficient to prescribe motion of the target object during the first instance of the digital draft procedure, the computer system can predict that the computer system may be unable to access sufficient visual information to similarly detect and verify the trajectory of an object during a future instance of the procedure. Accordingly, the computer system can implement methods and techniques described above to: prompt the secondary operator to supply a three-dimensional model of the target object (such as if the target object is depicted at low resolution in the first set of visual feeds depicting the first instance of the digital draft procedure); map the three-dimensional model of the target object to features of the target object detected in the first set of visual feeds to refine the estimated range of possible paths of the target object during this first step of the first instance of the digital draft procedure; and store a definition of the target object, the three-dimensional model of the target object, and this refined range of possible paths of the target object in the first step of the procedure.

During a later instance of the procedure, the computer system can implement similar methods and techniques to: detect an object analogous to the target object in visual feeds of the procedure zone; track the object in the procedure zone; map the three-dimensional model of the target object stored in the first step of the procedure to features of the object detected in these visual feeds to derive a range of possible paths of the object during this later instance of the procedure; confirm that this range of possible paths of the object falls within the target trajectory prescribed for the object in the first step of the procedure; and verify completion of the first step of this later instance of the procedure accordingly.

Additionally or alternatively, the computer system can implement methods and techniques described above to: prompt the primary operator to apply secondary indicia to the target object and repeat motion of the target object according to the first step of the procedure; track the second indicia on the target object over subsequent frames of the first set of visual feeds depicting the first instance of the digital draft procedure; derive a trajectory of the target object based on motion of the second indicia in the procedure zone; and store a prompt to apply secondary indicia to the target object in the first and this trajectory in the first step of the procedure. During a later instance of the procedure, the computer system can implement similar methods and techniques to: prompt an operator to apply secondary indicia to an object analogous to the target object; track the secondary indicia in visual feeds of the procedure zone; derive a trajectory of the object during this later instance of the procedure based on motion of the secondary indicia in the procedure zone; confirm that this trajectory falls approximates the target trajectory prescribed for the object in the first step of the procedure; and verify completion of the first step of this later instance of the procedure accordingly.

Yet alternatively, if the computer system detects insufficient visual information representing motion of the target object in the first set of visual feeds depicting the first step of the first instance of the digital draft procedure, the computer system can prompt the secondary operator to confirm manual verification of the first step of the procedure.

5.6.1 Example: Target Offset Distance

In one example, the computer system can interpret an offset distance between a target object and a reference object (e.g., table, equipment unit) during performance of the digital procedure. The computer system can then: populate a block in the sequence of blocks with the reference object; and link this reference object with a target offset distance to a target object defined in the digital procedure. In particular, the computer system can: identify the reference object and the target object in a target frame from a set of video feeds; extract a set of visual features from this target frame depicting the reference object and the target object; and interpret a relative offset distance between the target object and the reference object based on the set of visual features extracted from the target frame. Subsequently, the computer system can: identify that the relative offset distance matches a target configuration for the target object defined in the digital procedure, such as by receiving manual confirmation by a secondary operator observing the set of video feeds; and store this relative offset distance as the target offset distance in a corresponding block of the digital procedure.

Subsequently, in this implementation, a different operator performing the digital procedure can access the digital procedure containing the target configuration for the target object. Thus, in response to this operator initiating the digital procedure, the computer system can: render the first instruction—defining the target offset distance between the target object and the reference object—at a device associated with the operator; access a second set of video feeds depicting the operator performing this instruction; extract a set of visual features from the second set of video feeds; identify positions of the reference object and the target object in a frame from the second set of video feeds; and interpret a second offset distance between the reference object and the target object depicted in this frame based on the second set of visual features. Furthermore, the computer system can: in response to the second offset distance deviating from the target offset distance, generate a prompt to adjust the second offset distance to the target offset distance; and serve the prompt to an operator device associated with the operator.

5.7 Other Steps of the Procedure

The computer system can then repeat the foregoing processes during subsequent steps of the procedure to automatically define: object identification and presence requirements in the procedure zone; position requirements of target objects in the procedure zone; and/or motion requirements of target objects in the procedure zone necessary to inform accurate and repeatable verification of steps of the procedure.

The computer system can then: extract object identification, object presence, object position, and/or object motion characteristics directly from the first set of visual feeds captured during the first instance of the digital draft procedure based on these requirements; and retrieve external target object and target configuration data that define these requirements (e.g., three-dimensional models) for each step of the procedure Furthermore, the computer system can selectively assign manual verification of object identification, presence, position, and/or trajectory in these steps based on absence of sufficient information in the first set of visual feeds depicting the first instance of the digital draft procedure, which may predict similar absence of data in future instances of the procedure.

5.8 Augmented Digital Procedure

The computer system can then: configure individual steps of the digital draft procedure with these requirements, additional data, and manual verification flags; and compile these steps into an augmented digital procedure.

Then during a later instance of the procedure, the computer system can; automatically verify steps of the procedure based on data captured during the first instance of the digital draft procedure and stored in augmented digital procedure; and prompt a second operator to verify selective steps of the procedure for which the computer system predicted insufficient data for verification during the first instance of the digital draft procedure.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a operator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for augmenting a digital procedure for production of materials with automatic verification of objects comprising, during a setup period:
   initializing a first digital procedure corresponding to a first procedure zone within a facility and containing a sequence of instructional blocks;
   populating a first instructional block, in the sequence of instructional blocks, with a first instruction in a first set of formats and a first set of target objects associated with performance of the first instruction;
   in response to a first operator initiating a first instance of the first instructional block, in the sequence of instructional blocks, at the first procedure zone:
      accessing a first set of video feeds of a first operator performing the first instruction of the first instructional block;
      identifying a first target object, from the first set of target objects in the first instructional block, in a target frame from the first set of video feeds;
      extracting a first set of visual features from the target frame in the first set of video feeds depicting the first target object;
      calculating an identification score for the first target object depicted in the first set of video feeds based on the first set of visual features;
      in response to the first identification score falling below a target confidence threshold, applying a first fiducial to the first target object; and
      linking the first target object to the first fiducial in the first instructional block.

2. The method of claim 1, further comprising during a deployment period following the setup period:
   at a second operator device associated with a second operator, accessing the first digital procedure; and
   in response to the second operator initiating a second instance of the first instructional block, in the sequence of instructional blocks:
      presenting the first instruction, of the first instructional block, at the second operator device in a text format selected from the set of formats;
      accessing a second set of video feeds depicting the second operator performing the first instruction of the first instructional block;
      detecting the first fiducial in a second frame from the second set of video feeds based on a second set of visual features extracted from the second frame;

interpreting presence of the first target object in the second set of video feeds based on the first fiducial; and in response to completion of the first instructional block, initiating a second instructional block in the first digital procedure.

3. The method of claim 1, wherein accessing the first digital procedure at the second operator device comprises:

tracking a location of the second operator device within the facility;

detecting a set of equipment units proximal the second operator device based on the location of the second operator device within the facility;

retrieving a list of digital procedures, comprising the first digital procedure, associated with the first set of equipment units;

rendering the list of digital procedures on a display of the second operator device; and loading the first digital procedure from a database to the second operator device in response to selection of the first digital procedure, from the list of digital procedures by the second operator.

4. The method of claim 1:

wherein populating the first instructional block further comprises populating the first instructional block with a first set of target configurations for the first set of target objects; and further comprising during the setup period, in response to the first operator initiating the first instance of the first instructional block:

identifying the first target object corresponding to a first target configuration, in the first set of target configurations, for the first target object;

extracting a first relative position of the first target object from the target frame in the first set of video feeds; and storing the first relative position as a first target position for the first target object in the first instructional block.

5. The method of claim 4, further comprising during a deployment period following the setup period:

at a second operator device associated with a second operator, accessing the first digital procedure; and in response to the second operator initiating a second instance of the first instructional block, in the sequence of instructional blocks:

presenting the first instruction, of the first instructional block, at the second operator device in an audio format selected from the set of formats;

accessing a second set of video feeds depicting the second operator performing the first instruction of the first instructional block;

in response to detecting the first fiducial in a second frame, in the second set of video feeds, interpreting presence of the first target object;

extracting a second set of visual features from the second frame depicting the first target object;

interpreting a second relative position of the first target object based on the second set of visual features;

in response to the second relative position deviating from the first target position, generating a prompt to adjust the first target object to the first target position; and serving the prompt to the second operator device.

6. The method of claim 1:

wherein populating the first instructional block further comprises populating the first instructional block with a reference object linked to the first set of target objects; and further comprising during the setup period, in response to the first operator initiating the first instance of the first instructional block:

identifying the reference object in the target frame from the first set of video feeds;

interpreting a relative offset distance between the first target object and the reference object based on the first set of visual features extracted from the target frame; and storing the relative offset distance as a target offset distance in the first instructional block.

7. The method of claim 6, further comprising during a deployment period following the setup period:

at a second operator device associated with a second operator, accessing the first digital procedure; and in response to a second operator initiating a second instance of the first instructional block, in the sequence of instructional blocks:

presenting the first instruction, of the first instructional block, at the second operator device in a video format selected from the set of formats;

accessing a second set of video feeds depicting the second operator performing the first instruction of the first instructional block;

in response to detecting the first fiducial in a second frame, in the second set of video feeds, interpreting presence of the first target object;

extracting a second set of visual features from the second frame depicting the first target object;

detecting the reference object in the second frame based on the second set of visual features;

interpreting a second offset distance between the first target object and the reference object based on the second set of visual features;

in response to the second offset distance deviating from the target offset distance, generating a prompt to adjust the second offset distance to the target offset distance; and serving the prompt to the second operator device.

8. The method of claim 1, wherein identifying the first target object in the target frame comprises:

at a second operator device associated with a second operator, accessing the first set of video feeds depicting the first operator performing the first instruction; and receiving selection of the first target object in the target frame from the second operator at the second operator device.

9. The method of claim 1, wherein calculating the identification score for the first target object comprises:

generating a bounding box in the target frame defining a first region encompassing the first target object;

interpreting a feature constellation for the first target object based on a first subset of visual features, in the first set of visual features, extracted from the first region of the target frame; and calculating the identification score based on deviations of the feature constellation for the first target object from a target feature constellation for the first target object stored in the first instructional block.

10. The method of claim 1, further comprising in response to completion of the first instructional block, in the sequence of instructional blocks:

initiating a second instructional block, in the sequence of instructional blocks, comprising a second instruction in the set of formats and a second set of target objects associated with performance of the second instruction;

accessing a second set of video feeds of the first operator performing the second instruction of the second instructional block;

identifying a second target object, from the second set of target objects in the second instructional block, in a second target frame from the second set of video feeds;

extracting a second set of visual features from the second target frame depicting the second target object;

calculating a second identification score for the second target object based on the second set of visual features; and in response to the second identification score falling within the target confidence threshold, storing a second subset of visual features, in the second set of visual features, representing the second target object in the second instructional block.

11. The method of claim 1, further comprising during a deployment period following the setup period:

at a second device associated with a second operator, accessing the first digital procedure; and in response to the second operator initiating a second instance of the first instructional block, in the sequence of instructional blocks:

receiving selection of the first instruction in an augmented reality format at the second device;

accessing a second video feed from an optical sensor at the second device defining a field of view of the second operator;

detecting the first fiducial in a second frame from the second video feed based on a set of visual features extracted from the second frame;

interpreting presence of the first target object in a region of the second frame based on the first fiducial; and rendering the first instruction in the augmented reality format at a display of the second device in the region depicting the first target object.

12. The method of claim 1:

wherein identifying the first target object in the first frame comprises:

at a second operator device associated with a second operator, accessing the first set of video feeds depicting the first operator performing the first instruction; and receiving selection of the first target object in the target frame corresponding to a flask from the second operator at the second operator device;

wherein calculating the identification score for the first target object corresponding to the flask comprises:

generating a bounding box in the target frame defining a first region encompassing the flask;

interpreting a feature constellation for the flask in the first region of the target frame based a first subset of visual features, in the first set of visual features, extracted from the first region of the target frame; and calculating the identification score for the flask based on deviations of the feature constellation for the flask deviating from a target feature constellation for the flask stored in the first instructional block;

wherein applying the first fiducial to the first target object in response to the first identification score falling below a target confidence threshold comprises adhesively applying a first matrix barcode to an outer surface of the flask; and wherein linking the first target object to the first fiducial in the first instructional block comprises linking the first matrix barcode to the flask in the first instructional block.

13. The method of claim 1, wherein accessing the first set of video feeds of the first operator performing the first instruction of the first instructional block comprises:

accessing a first video feed from a first optical sensor mounted at the first procedure zone and defining a first field of view of the first operator performing the first instruction;

accessing a second video feed from a second optical sensor located at a first headset device associated with the first operator and defining a second field of view of the first operator performing the first instruction; and accessing a third video feed from a third optical sensor of an autonomous cart proximal the first procedure zone and defining a third field of view of the first operator performing the first instruction.

14. The method of claim 1, wherein populating the first instructional block, in the sequence of instructional blocks, with the first instruction in the first set of formats and the first set of target objects associated with performance of the first instruction comprises:

at a computer system, accessing an electronic document for a procedure designated for performance at the first procedure zone within the facility;

identifying a sequence of steps specified in the electronic document; and for a first step in the sequence of steps:

extracting the first instruction in the text format for the first step;

extracting a manifest of target objects defined in the first step;

initializing the first instructional block in the sequence of instructional blocks; and populating the first instructional block with the first instruction in the text format and the manifest of target objects.

15. A method for augmenting a digital procedure for production of materials with automatic verification comprising, during a setup period:

initializing first digital procedure corresponding to a first procedure zone within a facility and containing a sequence of instructional blocks;

populating a first instructional block, in the sequence of instructional blocks, with a first instruction in a first set of formats, a first set of target objects associated with performance of the first instruction, and a first set of target configurations associated with the first set of target objects; and in response to a first operator initiating a first instance of the first instructional block, in the sequence of instructional blocks, at the first procedure zone:

accessing a first set of video feeds of a first operator performing the first instruction of the first instructional block;

identifying a first target object, from the first set of target objects in the first instructional block, in a target frame from the first set of video feeds;

identifying the first target object corresponding to a first target configuration, in the first set of target configurations, for the first target object;

extracting a first set of visual features from the target frame depicting the first target object;

interpreting a first relative position of the first target object in the target frame based on the first set of visual features; and storing the first relative position as a first target position for the first target object in the first instructional block.

16. The method of claim 15, further comprising during a deployment period following the setup period:

at a second operator device associated with a second operator, accessing the first digital procedure; and in response to the second operator initiating a second instance of the first instructional block, in the sequence of instructional blocks:

accessing a second set of video feeds depicting the second operator performing the first instruction of the first instructional block;

extracting a second set of visual features from a second frame, in the second set of video feeds, depicting the first target object;

interpreting a second relative position of the first target object based on the second set of visual features; and in response to the second relative position deviating from the first target position, generating a prompt to adjust the first target object to the first target position; and serving the prompt to the second operator device.

17. The method of claim 15, wherein identifying the first target object corresponding to the first target configuration comprises:

at a second operator device associated with a second operator, accessing the first set of video feeds depicting the first operator performing the first instruction;

receiving selection of the first target object in the target frame from the second operator at the second operator device;

rendering the first target configuration of the first target object at the second operator device in response to receiving selection of the first target object, the first target configuration defining a target orientation of the first target object at a target region of the target frame;

receiving selection of the first target object matching the first target configuration from the second operator at the second operator device; and identifying the first target object as corresponding to the first target configuration based on the received selection of the first target object matching the first target configuration.

18. A method for augmenting a digital procedure for production of materials with automatic verification comprising, during a setup period:

initializing first digital procedure corresponding to a first procedure zone within a facility and containing a sequence of instructional blocks;

populating a first instructional block, in the sequence of instructional blocks, with a first instruction in a first set of formats, a first set of target objects associated with performance of the first instruction, and a reference object linked to the first set of target objects; and in response to a first operator initiating a first instance of the first instructional block, in the sequence of instructional blocks, at the first procedure zone:

accessing a first set of video feeds of a first operator performing the first instruction of the first instructional block;

identifying a first target object, from the first set of target objects in the first instructional block, in a target frame from the first set of video feeds;

identifying the reference object in the target frame from the first set of video feeds;

extracting a first set of visual features from the target frame depicting the first target object and the reference object;

interpreting a relative offset distance between the first target object and the reference object based on the first set of visual features extracted from the target frame; and storing the relative offset distance as a target offset distance in the first instructional block.

19. The method of claim 18, further comprising during a deployment period following the setup period:

at a second operator device associated with a second operator, accessing the first digital procedure; and in response to the second operator initiating a second instance of the first instructional block, in the sequence of instructional blocks:

accessing a second set of video feeds depicting the second operator performing the first instruction of the first instructional block;

extracting a second set of features from a second frame in the second set of video feeds;

detecting the first target object at a first region in the second frame and the reference object at a second region in the second frame offset from the first region;

interpreting a second offset distance between the first target object and the reference object depicted in the second frame based on the second set of features;

in response to the second offset distance deviating from the target offset distance, generating a prompt to modify the second offset distance to the target offset distance; and serving the prompt to the second operator device.

20. The method of claim 19, wherein detecting the first target object at the first region in the second frame and the reference object at the second region in the second frame comprises:

detecting a first fiducial in the first region of the second frame based on a first subset of visual features, in the second set of visual features, extracted from the first region of the second frame;

querying a manifest of objects in the first instructional block for the first target object linked to the first fiducial;

detecting a second fiducial in the second region of the second frame based on a second subset of visual features, in the second set of visual features, extracted from the second region of the second frame; and querying the manifest of objects in the first instructional block for the reference object linked to the second fiducial.

* * * * *